United States Patent [19]

Nowacki

[11] 4,441,377

[45] Apr. 10, 1984

[54] LINKAGE FOR ACTUATING A CARTON ERECTING APPARATUS

[75] Inventor: Ulrich G. Nowacki, Leisure City, Fla.

[73] Assignee: International Paper Company, New York, N.Y.

[21] Appl. No.: 339,999

[22] Filed: Jan. 18, 1982

Related U.S. Application Data

[62] Division of Ser. No. 100,402, Dec. 5, 1979, Pat. No. 4,331,435.

[51] Int. Cl.³ .............................................. F16H 21/44

[52] U.S. Cl. ...................................................... 74/105

[58] Field of Search ................ 74/99 R, 102, 105, 106

[56] References Cited

U.S. PATENT DOCUMENTS

| | | | |
|---|---|---|---|
| 2,244,801 | 6/1941 | Peterson | 74/105 |
| 2,708,825 | 5/1955 | Neary | 74/520 |
| 3,024,605 | 3/1962 | Nash | 74/106 |
| 3,550,855 | 12/1970 | Feld et al. | 74/105 |
| 3,842,839 | 10/1974 | Malis | 74/106 |

*Primary Examiner*—Lawrence J. Staab

*Attorney, Agent, or Firm*—Charles B. Smith; Janet C. Lentz; Ronald A. Schapira

[57] ABSTRACT

A linkage for actuating a pair of suction cups that are located adjacent the other end of the guide rails and that can fold an upwardly inclined blank on the guide rails; the suctions cups being adapted to hold by suction two adjacent side panels of the blank, that are contiguous to the lower guide rail and on vertically opposite sides of the blank, and to rotate in opposite directions about the lower guide rail until the suction cups are 90° apart, so that the two adjacent side panels are folded 90° apart about the lower guide rail and thereby the blank is folded into a rectangular tube.

2 Claims, 13 Drawing Figures

LINKAGE FOR ACTUATING A CARTON ERECTING APPARATUS

This is a division of application Ser. No. 100,402, filed Dec. 5, 1979, now issued as U.S. Pat. No. 4,331,435, entitled METHOD AND APPARATUS FOR ERECTING A CARTON.

BACKGROUND OF THE INVENTION

1. Field of the Invention

The present invention relates to container fabrication equipment and more particularly to a method and apparatus for erecting rectangular paperboard cartons from flat blanks.

2. Prior Art

Rectangular paperboard cartons have commonly been used to ship manufactured goods such as processed food and machine parts, as well as fresh produce, to distributors, retail outlets and ultimate consumers. A common form of such cartons has comprised a one-piece paperboard member having four upstanding rectangular side panels, foldably connected along opposite upstanding edges, and four horizontal rectangular bottom panels, foldably connected to adjacent bottom edges of the side panels. The cartons have frequently been manufactured in the form of blanks which can be shipped flat for convenience and economy and subsequently erected by the user. Thus, it has often been necessary for the user of the cartons to erect the cartons by properly folding the panels of their flat blanks and then adhesively bonding their bottom panels together prior to filling the cartons with manufactured goods or produce.

Of course, it has been possible to erect such cartons manually from their flat blanks by: folding the side panels of each blank, so that they form a rectangular tube; folding the bottom panels of each blank towards each other; applying adhesive to the bottom panels; and then adhesively bonding the bottom panels together. However, it has been economically desirable to perform some or all of these operations automatically with a machine, especially designed to erect the cartons, such as the apparatus disclosed in U.S. Pat. No. 4,160,406.

SUMMARY OF THE INVENTION

In accordance with the invention, a method of erecting rectangular cartons from their flat blanks is provided, comprising the steps of:

- providing the blanks in a stack;
- providing the bottom blank of the stack on one end of a pair of parallel guide rails; the foldably connected edges of the side panels of each blank extending in a direction parallel to the guide rails; one of the guide rails being elevated above the other guide rail, so that the bottom blank, as well as the other blanks in the stack above it, are upwardly inclined in the cross-direction of the guide rails;
- moving the bottom blank on the guide rails, from the stack of blanks to the other end of the pair of guide rails, to an initial folding station;
- in the initial folding station, contacting each of two adjacent side panels of the bottom blank, contiguous to one of the guide rails and on vertically opposite sides of the bottom blank, with a separate means for folding the contacted side panel about the one guide rail with rotational movement of the folding means about the one guide rail while the folding means remains in contact with the side panel; the two folding means being approximately 0° apart when they contact the two adjacent side panels; and then
- rotating the two folding means in opposite directions about the one guide rail until the two folding means are about 90° apart, while each folding means remains in contact with one of the two adjacent side panels, to fold the two adjacent side panels 90° apart about the one guide rail and thereby to fold the bottom blank into a rectangular tube.

Also in accordance with this invention, an apparatus for erecting a rectangular carton from a flat blank is provided, which comprises:

- a pair of parallel guide rails, one of which is elevated above the other;
- a hopper, located at one end of the guide rails, for holding a stack of blanks between the guide rails, so that the bottom blank of the stack is on the guide rails and is upwardly inclined in the cross-direction of the guide rails; the foldably connected edges of the side panels of each blank extending in a direction parallel to the guide rails;
- means located adjacent the other end of the guide rails for initially folding a blank on said other end of the guide rails into a rectangular tube; the initial folding means comprising means for folding, about one of the guide rails, two adjacent side panels of the blank, contiguous to the one guide rail and on vertically opposite sides of the blank so that the two adjacent side panels are folded 90° apart about the one guide rail and thereby the blank is folded into the rectangular tube; and
- means, beneath and parallel to the bottom blank of the stack, for moving the bottom blank on the guide rails from the hopper to said other end of the guide rails.

BRIEF DESCRIPTION OF THE DRAWINGS

FIG. 6 also shows certain principal elements of the adhesive applying station, that are used to apply adhesive to the bottom panels of the rectangular tube, and certain principal elements of a final blank folding station, that are used to hold the upper bottom panel of the rectangular tube in its folded position.

DETAILED DESCRIPTION OF THE PREFERRED EMBODIMENT

Figure 1:
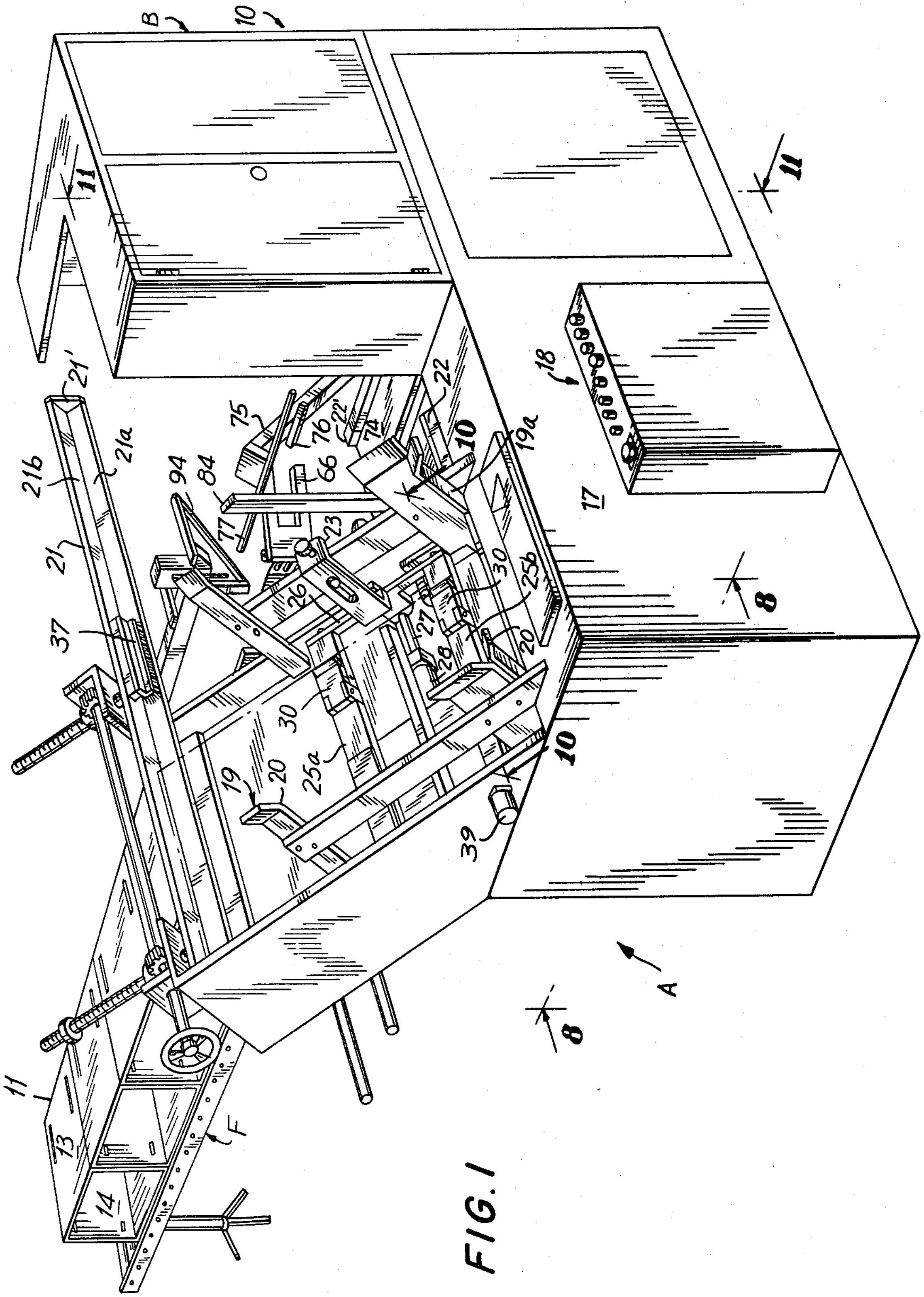
FIG. 1 is a perspective view of an apparatus for erecting a rectangular carton from its flat blank according to the present invention. A carton blank feeding station is at the left of the apparatus in FIG. 1, and carton blank folding stations are at the right of the apparatus. Not shown in FIG. 1 are stations for applying adhesive to the bottom panels of the carton blank and for adhesively bonding the bottom panels together to form a completed erect carton. A carton blank is moved through the apparatus, as shown in FIG. 1, from front left to rear right and then from rear right to rear left.

Shown in FIGS. 1 to 13 is an apparatus, generally 10, in accordance with this invention. The apparatus is useful for erecting a carton, generally 11, from a flat one-piece paperboard blank, generally 12. The apparatus 10 of this invention is compact. Hence, it occupies a minimum amount of floor space and can be suitably mounted on lockable caster wheels (not shown) for easy movement within a manufacturing plant.

The carton 11, erected from blank 12 by the apparatus 10, is a conventional rectangular carton 11, useful for holding manufactured goods, fresh produce and the like. The carton can be suitably made of one or more, conventional, layers of paperboard, such as corrugated paperboard. Preferably, the carton 11 includes: four foldably connected side panels, i.e., a pair of side wall panels 13 and a pair of end wall panels 14; and four bottom panels, i.e., a pair of bottom side panels 15, foldably connected to the side wall panels 13, and a pair of bottom end panels 16, foldably connected to the end wall panels 14. If desired, the carton 11 also can include four rectangular top panels (not shown).

Figure 4:
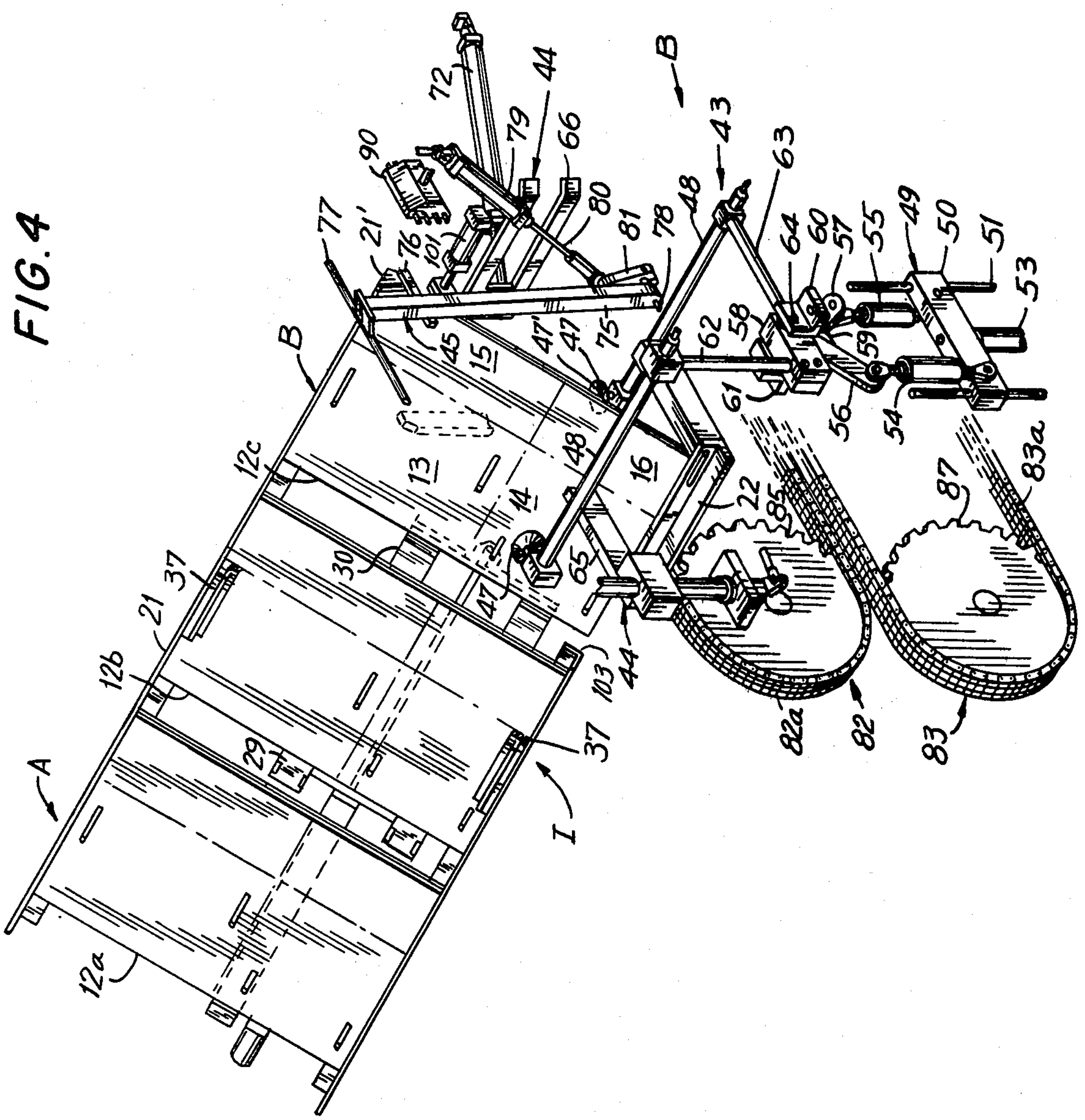
FIG. 4 is a fragmentary perspective view of the blank feeding station and the buffer station, shown in FIG. 3, and certain principal elements that are used for folding side and bottom panels of the blank in an initial blank folding station, so that the blank is formed into a stable rectangular tube.
Figure 5:
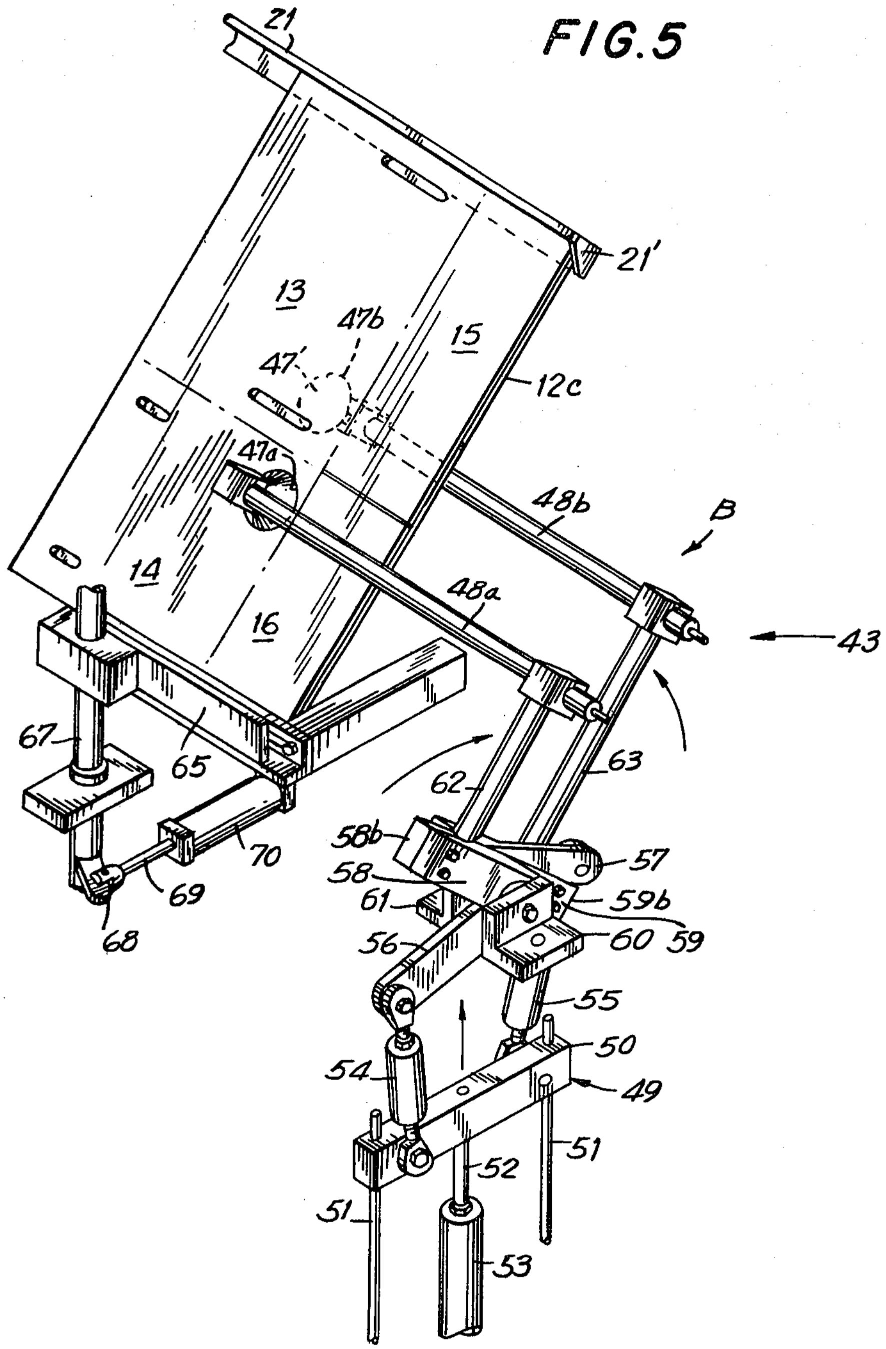
FIG. 5 is a fragmentary perspective view of the operation of certain principal elements, shown in FIG. 4, that are used for folding the side panels of the blank to form the rectangular tube in the initial folding station.
Figure 6:
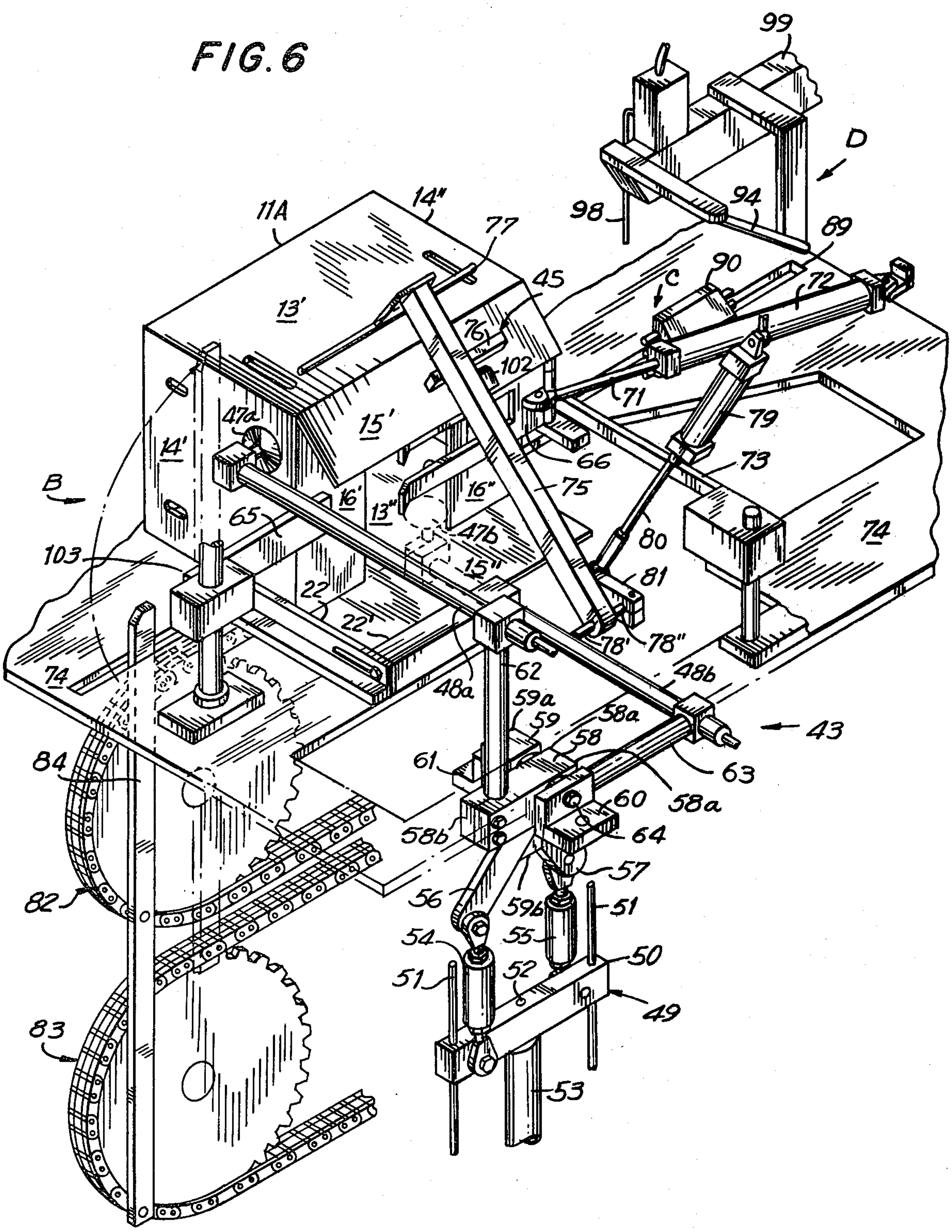
FIG. 6 is a fragmentary perspective view of the operation of certain principal elements, shown in FIG. 4, that are used to fold the side panels, the upstanding bottom panels, and the horizontal upper bottom panel of the blank to form the stable rectangular tube in the initial folding station.
Figure 7:
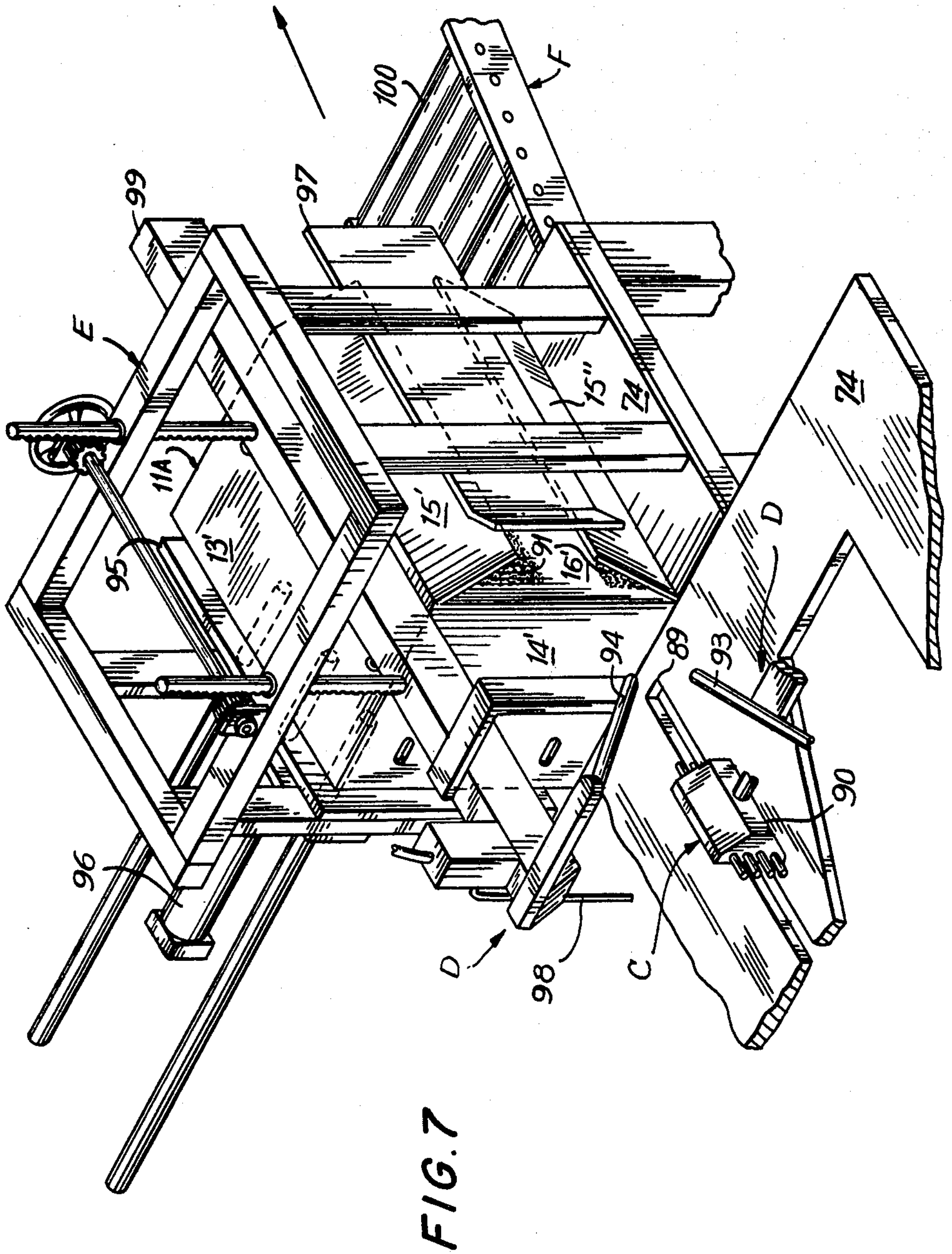
FIG. 7 is a fragmentary perspective view of the principal elements of the adhesive applying station, the principal elements of the final folding station, including the elements that are used to fold the unfolded horizontal lower bottom panel of the rectangular tube, and the principal elements of a bottom bonding station, that are used to adhesively bond the bottom panels together.

The apparatus 10 of this invention generally comprises: a station, generally A, as shown in FIGS. 1–4 and 8–10, for feeding an individual flat carton blank 12 from a stack 12' of blanks; a station, generally B, as shown in FIGS. 1, 4–6 and 11–12, for folding the side panels 13 and 14 of the flat blank 12 into a rectangular tube 11A and then folding the upstanding bottom end panels 16 of the rectangular tube 11A towards each other and folding at least one of the horizontal bottom side panels 15, preferably the upper bottom side panel 15', of the rectangular tube 11A towards the other bottom side panel 15; a station, generally C, as shown in FIGS. 6 and 7, for applying adhesive to the bottom end panels 16; a station, generally D, as shown in FIG. 7, for folding the other horizontal bottom side panel 15, preferably the lower bottom side panel 15'', towards the previously folded, bottom side panel 15, preferably the upper bottom side panel 15'; and a station, generally E, as shown in FIG. 7, for adhesively bonding together the bottom panels 15 and 16 to form a completed erect carton 11. The apparatus 10 also includes: conventional means, generally F, shown in FIGS. 1 and 7, for automatically conveying completed erect cartons 11 away from the bottom bonding station E; a conventional vacuum pump G, schematically shown in FIG. 8, for providing a source of vacuum or suction for a pair of suction devices; a conventional electric motor H, schematically shown in FIG. 8; and a conventional air compressor (not shown) for providing a source of air under pressure to actuate several double-acting air-operated cylinders.

As seen from FIG. 1, a cover, generally 17, such as a sheet metal cover, encloses and protects many of the elements of the apparatus 10 of this invention. Preferably, the cover 17 is attached to a rigid frame (not shown), such as a steel frame, to which other individual elements of the apparatus 10 of this invention also are securely attached. The cover 17, as well as any structural frame which supports it, do not form any part of the invention in the apparatus 10 but rather simply constitute conventional means for assembling the apparatus 10.

As also seen from FIG. 1, a plurality of controls, generally 18, for the electrical, mechanical and pneumatic devices used in the apparatus 10 of this invention are mounted on the cover 17. The controls 18 also are conventional and do not form any part of the invention in the apparatus 10.

Turning now to the principal elements of the apparatus and method of this invention for erecting a carton, the carton blank feeding station A of the apparatus 10 is provided with a hopper, generally 19, for holding the stack 12' of flat carton blanks 12 as shown in FIG. 1. The hopper 19 is securely mounted on the frame (not shown) of the apparatus 10. The hopper 19 is formed from a plurality of spaced upstanding rigid guides 20, between which the blanks 12 can be stacked. Preferably, the hopper 19 and its guides 20 are inclined upwardly at an acute angle to the horizontal in the cross-direction of the apparatus.

Figure 8:
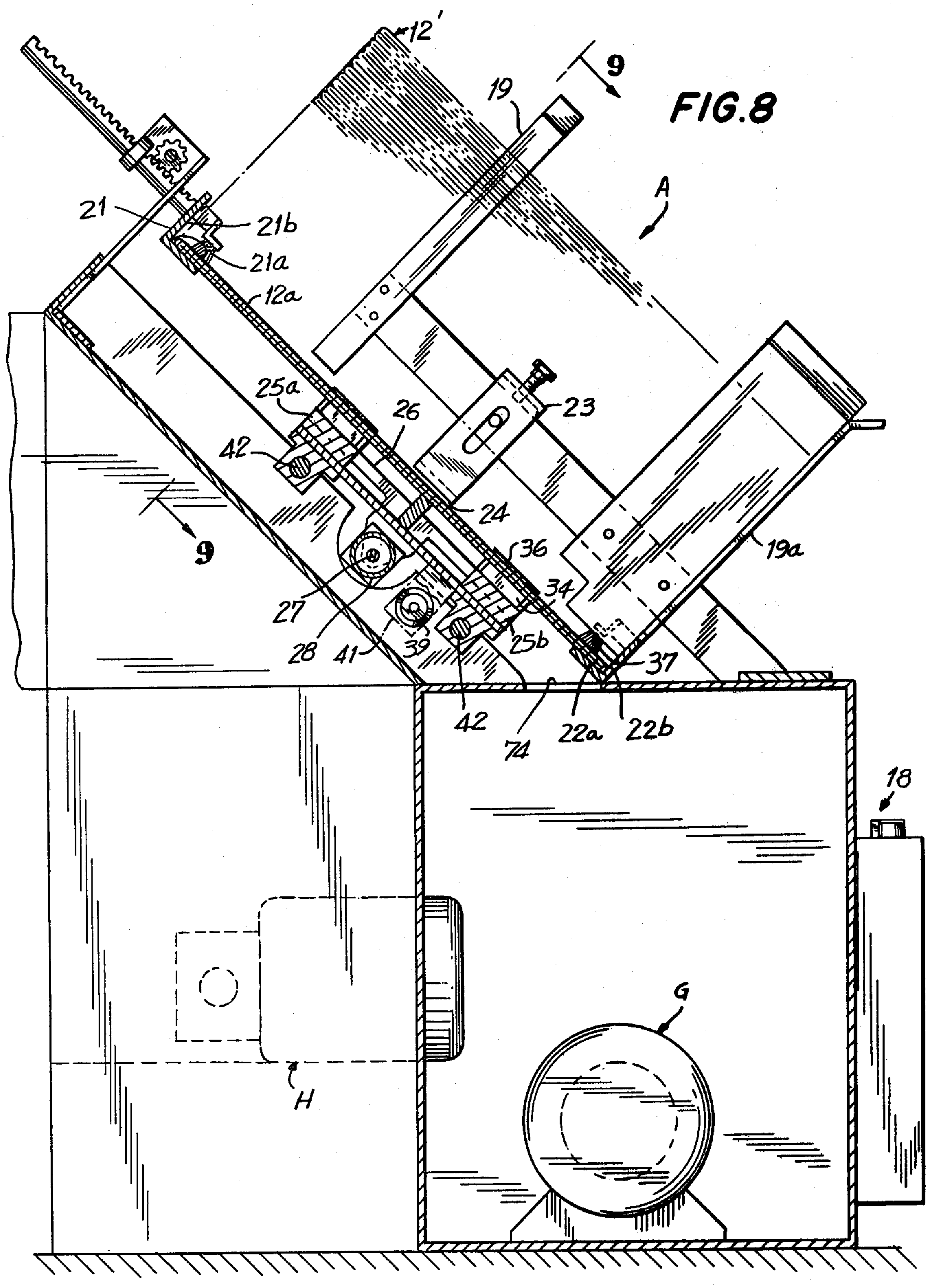
FIG. 8 is a sectional view taken along line 8—8 in FIG. 1, showing the blank feeding station in detail.

As shown in FIG. 8, the bottom carton blank 12*a* of the stack 12' of blanks in the hopper 19 rests on one end of a pair of rigid parallel guide rails 21 and 22, mounted on the frame of the apparatus 10. The two guide rails 21 and 22 extend in the machine direction of the apparatus, between the blank feeding station A and the initial blank folding station B. In accordance with the invention in the apparatus 10, one of the guide rails, preferably the guide rail 21 which is closer to the final blank folding station D, is above the other guide rail 22. This causes the bottom blank 12*a*, which rests on the guide rails 21 and 22, as well as the other blanks of the stack 12', which rest on the bottom blank 12*a*, to be inclined upwardly in the cross-direction of the guide rails 21 and 22 and the apparatus 10, preferably at about the same acute angle to the horizontal as the hopper 19. As a result, most of the weight of the upwardly inclined stack 12' of blanks 12 rests upon, and is supported by, the lower guide rail 22 and the upwardly inclined, lower side 19*a* of the hopper 19.

Figure 2:
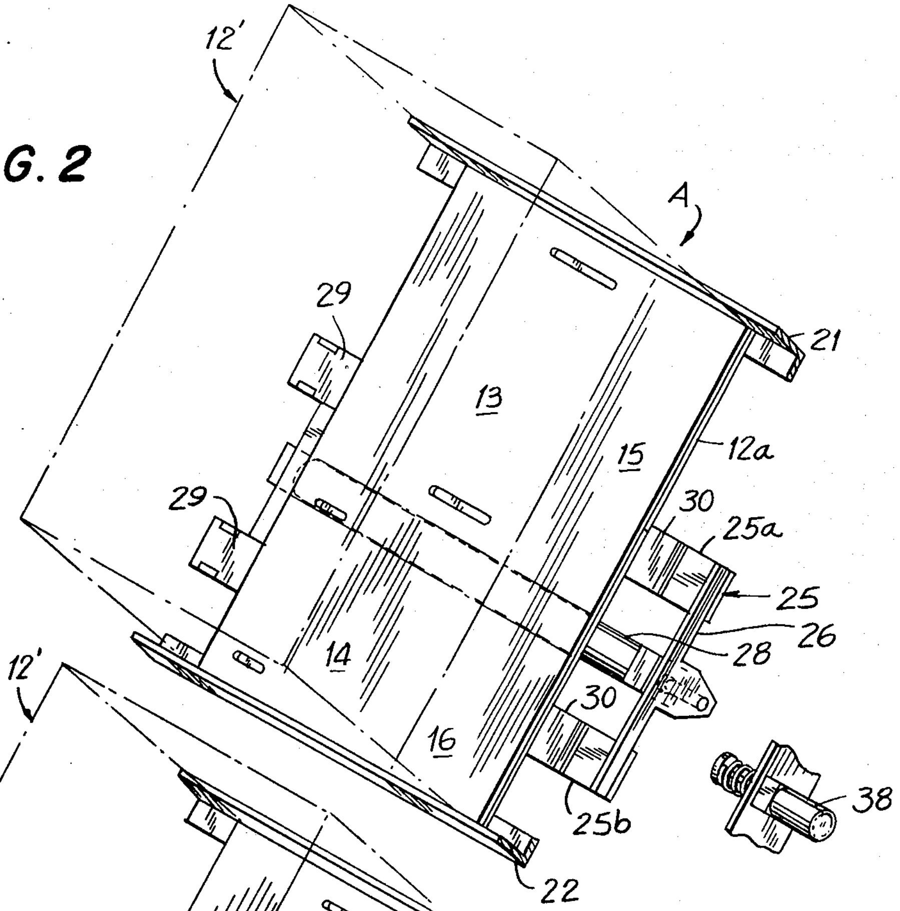
FIG. 2 is a fragmentary perspective view of the blank feeding station, shown in FIG. 1.
Figure 3:
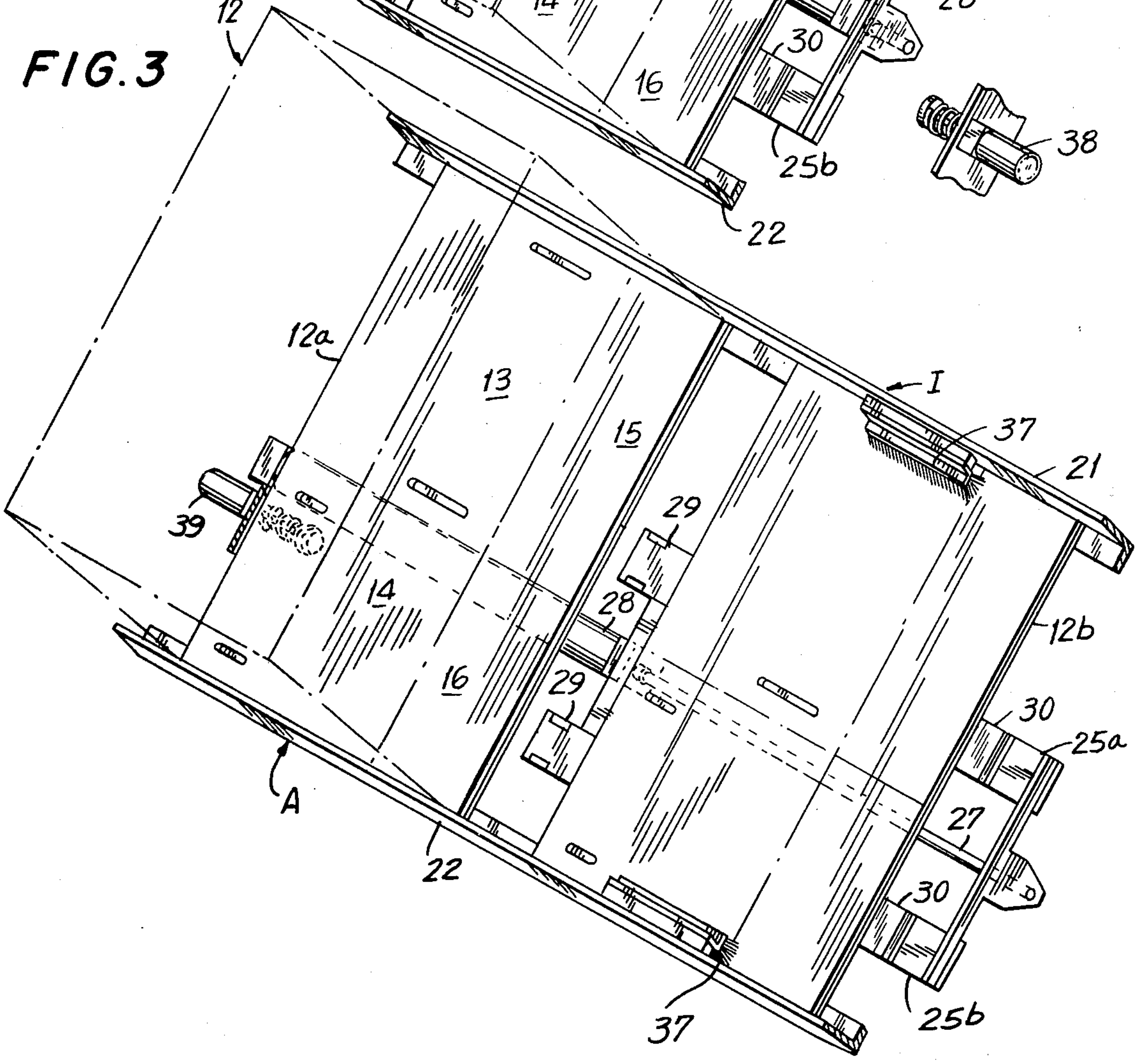
FIG. 3 is a fragmentary perspective view of the blank feeding station, shown in FIG. 1, and a buffer station which is between the blank feeding station and the blank folding stations.

As seen from FIGS. 2 to 4, each blank 12 is placed in the hopper 19 on the apparatus 10, so that the foldably connected edges of the side panels 13 and 14 of each blank 12 extend in a direction parallel to the guide rails 21 and 22. In this regard, the bottom panels 15 and 16 of each blank 12 in the hopper 19 preferably are closer to the initial folding station B of the apparatus 10 than are its side panels 13 and 14.

The specific acute angle, with respect to the horizontal, of each blank 12, resting on the guide rails 21 and 22 and stacked in the hopper 19, is not critical and can, for example, suitably be about 30° to 60°. Preferably the acute angle formed by each blank 12 is about 45°. It has been found that the use of the hopper 19, in which the blanks 12, particularly the bottom blank 12*a*, are at an acute angle, simplifies and expedites the feeding of individual blanks along the guide rails 21 and 22 to the initial folding station B. In this regard, sliding friction is substantially reduced between the bottom blank 12*a* and the underlying guide rails 21 and 22 as the bottom blank is moved along the guide trails from beneath the stack 12' of blanks in the hopper 19 towards the initial folding station B. As a result, it is much easier, and much less force is required, to move the bottom blank 12*a* out from under the stack 12' when feeding the bottom blank to the initial folding station B.

As also shown in FIGS. 1 and 8, each guide rail 21 and 22 preferably comprises a rigid one-piece member, having a pair of smooth flat abutting surfaces 21*a*, 21*b* and 22*a*, 22*b* that are perpendicular to each other. One of the smooth surfaces 21*a* and 22*a* of each guide rail 21 and 22 underlies the bottom blank 12*a* of the stack 12' of blanks. Preferably, such underlying guide rail surfaces 21*a* and 22*a* are coplanar and are upwardly inclined at about the same acute angle to the horizontal as the bottom blank 12*a*. The other smooth surface 21*b* and 22*b* of each guide rail 21 and 22 is perpendicular to the underlying surface 21*a* and 22*a* of its guide rail. Preferably, such perpendicular guide rail surfaces 21*b* and 22*b* are each parallel to the upwardly inclined, lower side 19*a* of the hopper 19 and the upwardly inclined, lower side of the stack 12' of blanks 12 in the hopper 19, and the perpendicular surface 22*b* of the lower guide rail 22 is beneath, and coplanar with, the inside surface of the lower side 19*a* of the hopper 19.

Figure 11:
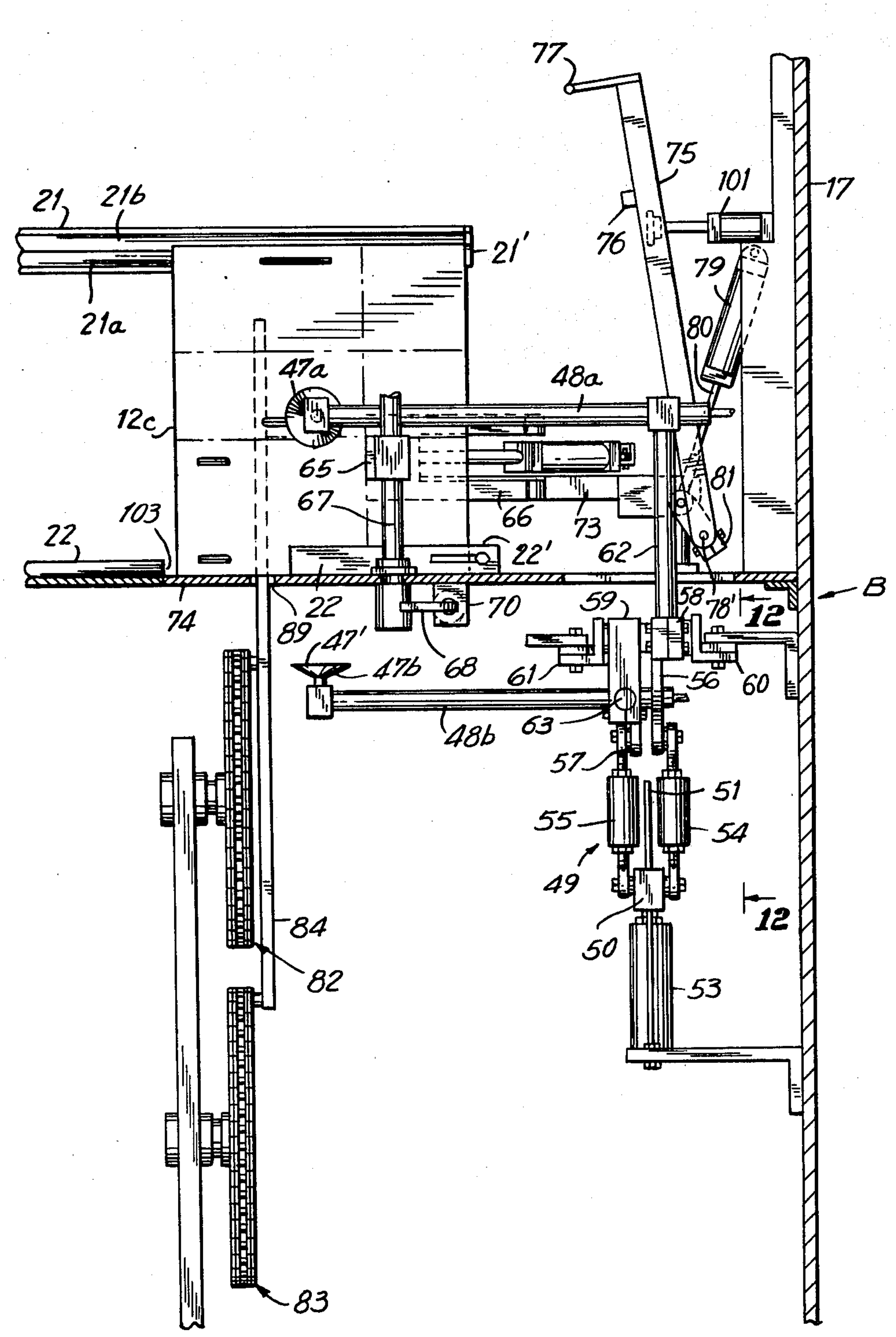
FIG. 11 is a sectional view taken along line 11—11 in FIG. 1, showing the initial folding station in detail.

As shown in FIGS. 1, 4 and 11, each pair of guide rail surfaces 21*a*, 21*b* and 22*a*, 22*b* is provided with a limit stop 21' and 22' at the other end of each guide rail 21 and 22 in the initial folding station B. It is preferred that the limit stops 21' and 22' be vertically aligned. It is also preferred that the lower guide rail 22 not have its underlying surface 22*a* extend all the way to the initial folding station B.

Mounted between the hopper guides 20, closest to the initial folding station B, is a blank stop 23, shown in FIGS. 1 and 8–10. The blank stop 23 comprises a rigid member, the bottom 24 of which is located just above the bottom blank 12*a* of the stack 12' of blanks.

Lying between the guide rails 21 and 22 and beneath the bottom blank 12*a* in the blank feeding station A is a movable carriage, generally 25, shown in FIGS. 1 and 8–10. The carriage 25 comprises a pair of rigid elongated members 25*a* and 25*b* of rectangular cross-section that are parallel to the guide rails 21 and 22. One of the carriage members 25*a*, which is closer to the upper guide rail 21, is above the other carriage member 25*b*, which is closer to the lower guide rail 22, so that the carriage 25 is inclined upwardly in the cross-direction at about the same acute angle to the horizontal as the bottom blank 12*a*. The ends of the carriage members 25*a* and 25*b* are connected by a pair of rigid parallel braces 26. The carriage 25 is connected, preferably at its brace 26 that is closest to the initial folding station B, to the piston 27 of a first double-acting air-operated cylinder 28. The first cylinder 28 is horizontally mounted on the frame of the apparatus 10, beneath the carriage members 25*a* and 25*b*. The piston 27 of the first cylinder 28 is adapted to move, when the first cylinder 28 is actuated, horizontally in the machine direction between the blank feeding station A and the initial folding station B and through a buffer station, generally I, located between the blank feeding station A and the initial folding station B. The carriage 25 is adapted to move in the machine direction with the piston 27 of the first cylinder 28 between the blank feeding station A and the initial folding station B, via the buffer station I.

Figure 9:
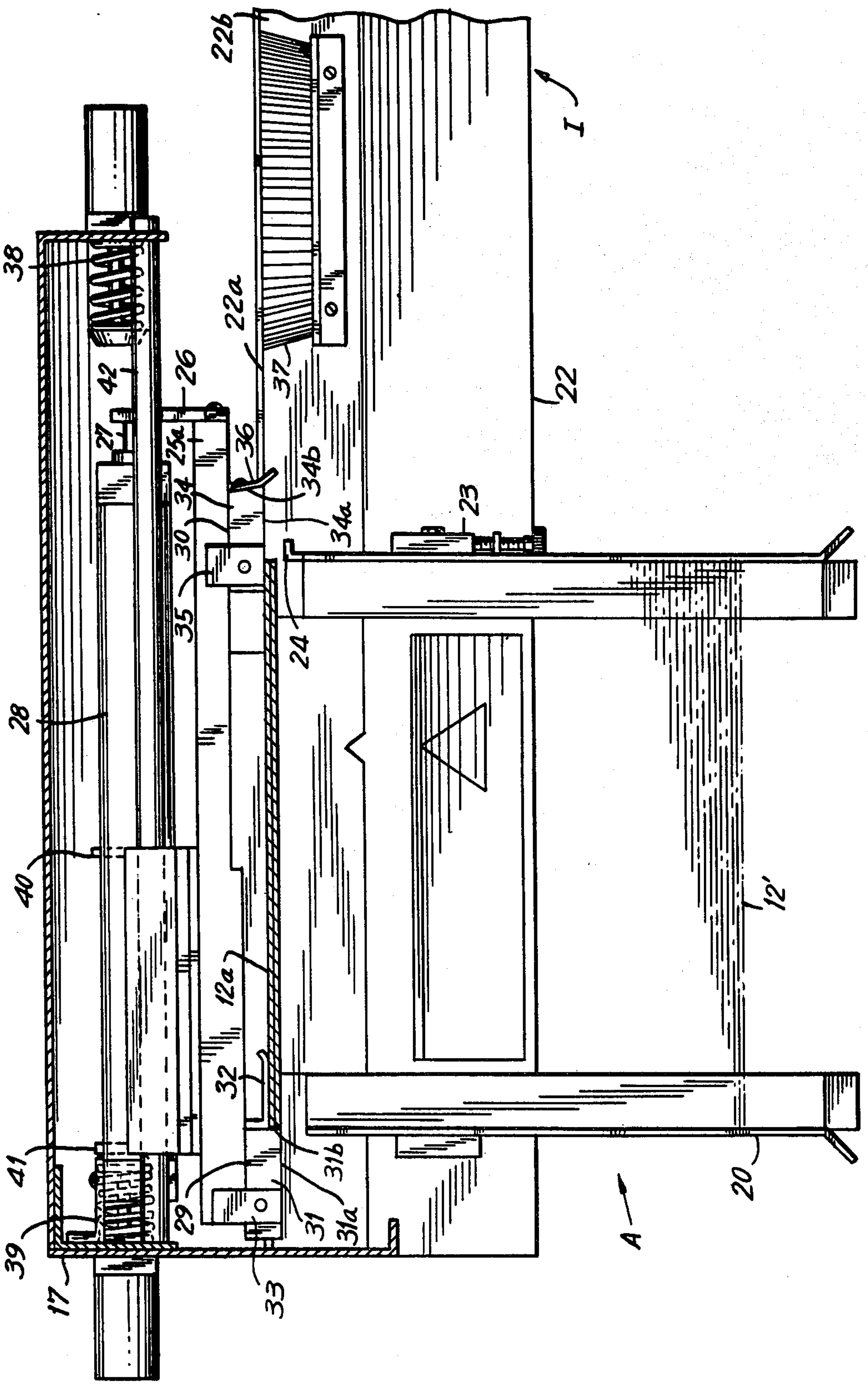
FIG. 9 is a sectional view taken along line 9—9 in FIG. 8, showing the blank feeding station in detail.
Figure 10:
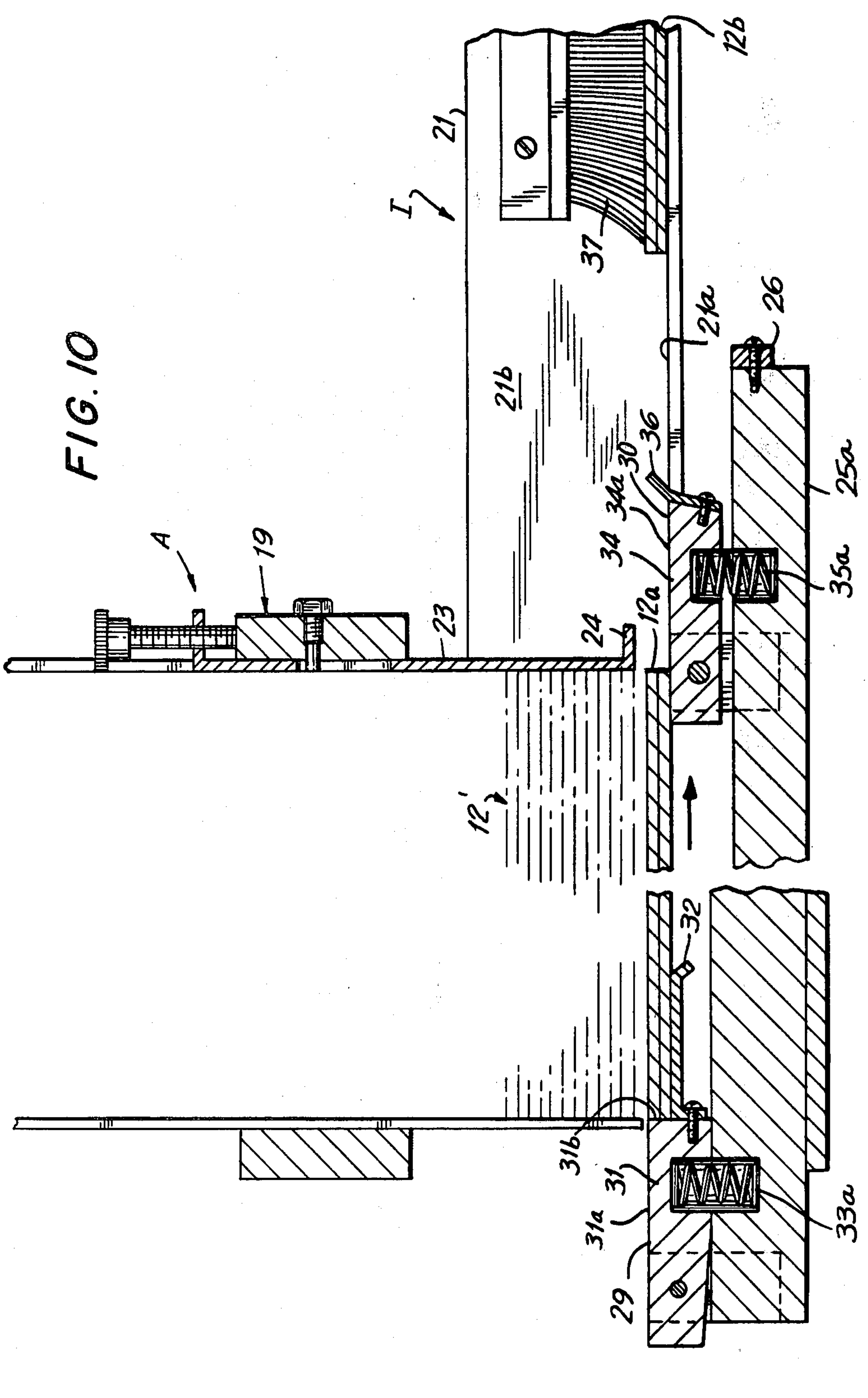
FIG. 10 is a sectional view taken along line 10—10 in FIG. 1, showing the blank feeding station in detail.

Mounted atop the cartiage 25 are one or more primary pushers 29 and one or more secondary pushers 30, shown in FIGS. 8–10. Preferably, a primary pusher 29 and a secondary pusher 30 are located atop each carriage member 25*a* and 25*b* and are aligned in the machine direction, with the secondary pushers 30 being closer to the initial folding station B than the primary pushers 29. Each primary pusher 29 is adapted to move just the bottom blank 12*a* out from under the stack 12' of flat blanks 12 in the hopper 19 of the feeding station A, beneath the blank stop 23, along the underlying surfaces 21*a* and 22*a* of the guide rails 21 and 22, to the buffer station I (where the blank is referred to as blank 12*b*) when the carriage 25 is moved towards the initial folding station B by the piston 27 of the first cylinder 28. Each secondary pusher 30 is adapted to move just a blank 12*b* from the buffer station I to the initial folding station B (where the blank is referred to as blank 12*c*), along the underlying surfaces 21*a* and 22*a* of the guide rails 21 and 22, when the carriage 25 is moved towards the initial folding station B by the piston 27 of the first cylinder 28.

As seen from FIGS. 9 and 10, each primary pusher 29 preferably comprises a rigid block 31 atop a carriage member 25*a* and 25*b*. The top 31*a* of each primary pusher block 31 is parallel to the carriage 25 and the bottom blank 12*a* of the stack 12' of blanks in the hopper 19. The top 31*a* of each primary pusher block 31 is located above the top of the bottom blank 12*a* and below the bottom 24 of the blank stop 23. A ledge 32, parallel to the carriage 25 and the bottom blank 12*a*, is mounted on the side 31*b* of each primary pusher block 31, closest to the initial folding station B. The primary pusher ledges 32 are mounted below the tops 31*a* of the primary pusher blocks 31, so that the tops of the ledges 32 are coplanar and are beneath the tops 31*a* of the blocks 31 by a distance about equal to the thickness of a flat blank 12.

Each primary pusher block 31 preferably is mounted on a carriage member 25*a* and 25*b* in such a way that its ledge 32 is adapted to move downwardly a short distance towards its carriage member 25*a* and 25*b*. This allows each primary pusher ledge 32 to maintain continuous contact with blanks 12 of varying thicknesses, e.g., blanks of varying warpage, which are atop the ledge 32. As a result, it is preferred that one end of each primary pusher block 31, remote from the initial folding station B, be pivotally mounted a small distance above its carriage member 25*a* and 25*b*, between a pair of upstanding parallel arms 33 mounted on the carriage member, so that each primary pusher block and ledge 31 and 32 can pivot downwardly towards their carriage member when the bottom blank 12*a*, atop the primary pusher ledge 32, presses the ledge 32 downwardly. In this regard, it is also preferred that a spring 33*a* be biased against the top of each carriage member 25*a* and 25*b* and the bottom of each primary pusher block 31, between its ledge 32 and its upstanding arms 33, so that each primary pusher block and ledge 31 and 32 can recover and pivot upwardly when no blank 12 presses the primary pusher ledge 32 downwardly.

As also seen from FIGS. 9 and 10, each secondary pusher 30, like each primary pusher 29, preferably comprises a rigid block 34 that is mounted a small distance above a carriage member 25*a* and 25*b*, between a pair of upstanding parallel arms 35. The tops 34*a* of the secondary pusher blocks 34 are parallel to the carriage 25 and the bottom blank 12*a* of the stack 12′ of blanks in the hopper 19 and are coplanar with the tops of the primary pusher ledges 32. The secondary pusher arms 35 are mounted on the carriage members 25*a* and 25*b* and are pivotally connected to the ends of the secondary pusher blocks 34, remote from the initial folding station B. An upstanding finger 36 is mounted on the side 34*b* of each secondary pusher block 34, closest to the initial folding station B. Each secondary pusher finger 36, like each primary pusher ledge 32, can be pressed downwardly, with its pusher block 34, a short distance towards its carriage member 25*a* and 25*b*. A spring 35*a* is biased against the top of each carriage member 25*a* and 25*b* and the bottom of each secondary pusher block 34, between its upstanding arms 35 and its secondary pusher finger 36, so that each secondary pusher block and finger 34 and 36, like each primary pusher block and ledge 31 and 32, can recover and move upwardly when not being pressed downwardly. However, unlike each primary pusher ledge 32, each secondary pusher finger 36 extends above the top surface 34*a* of its secondary pusher block 34, preferably by a distance at least equal to the thickness of a flat blank 12, and each finger 36 is preferably angled upwardly towards the initial folding station B. Because the end of each secondary pusher block 34, remote from the initial folding station B, is pivotally connected to the carriage 25, each upstanding secondary pusher finger 36 is pressed downwardly, with its pusher block 34, when horizontal pressure is applied against the finger 36 in the machine direction, towards the initial folding station B, but the finger 36 is not pressed downwardly when horizontal pressure is applied against the finger 36 in the machine direction, towards the blank feeding station A.

Mounted on the perpendicular surface 21*b* and 22*b* of each guide rail 21 and 22 in the buffer station I, above the underlying surface 21*a* and 22*a* of each guide rail 21 and 22, is a flexible restraining member 37, such as a brush. As shown in FIGS. 3, 4 and 8–10, each flexible restraining member 37 is adapted to allow a flat blank 12*b* to be moved by the primary pushers 29 into the buffer station I between the restraining member 37 and the underlying guide rail surface 21*a* and 22*a* and then to press the blank downwardly against the underlying guide rail surface to hold down the blank on the guide rails 21 and 22 and to hold by friction the blank in the buffer station. In this regard, the two restraining members 37 are adapted to press the blank 12*b* towards the plane of the underlying guide rail surfaces 21*a* and 22*a*. This assures that the secondary pusher fingers 36 will be able to contact the blank 12*b*, even if it is warped somewhat, and move the blank towards the initial folding station B. The two restraining members 37 also are adapted to frictionally restrain the blank 12*b* from either: (a) moving from its own inertia beyond the buffer station I towards the initial folding station B after the blank 12*b* has been moved by the primary pushers 29 from the feeding station A beneath the restraining members 37 in the buffer station I; or (b) being moved towards the blank feeding station A when the secondary pushers 30 and their fingers 36 move through the buffer station I towards the blank feeding station A. The restraining members 37 further are adapted to allow the blank 12*b* to be moved from the buffer station I to the initial folding station B by the secondary pushers 30 and their fingers 36. However, the distance between each restraining member 37 and the underlying guide rail surface 21*a* and 22*a*, below it, and the construction and material of each restraining member 37 are not critical, and the proper location and construction of the restraining members 37 can be routinely determined, so that the restraining members 37 serve to hold down a blank 12*b* in the buffer station I after movement of the primary pushers 29 towards the initial folding station B has ceased and when the secondary pushers 30 and their fingers 36 move beneath the blank 12*b*, in the buffer station I, towards the blank feeding station A.

As shown in FIGS. 2, 3 and 9, a pair of spring-loaded bumpers 38 and 39 are mounted horizontally on the apparatus 10, adjacent the lower guide rail 22. The bumpers 38 and 39 act as shock absorbers at the opposite ends of travel of the carriage 25 between the blank feeding station A and the initial folding station B. The first bumper 38 is preferably located between the blank feeding station A and the buffer station I, and the second bumper 39 is preferably beneath the blank feeding station A. As shown in FIGS. 8 and 9, a pair of downwardly extending flanges 40 and 41 are mounted beneath the lower carriage member 25*b*, adjacent the lower guide rail 22. The first carriage flange 40 is aligned in the machine direction with the first bumper 38 and is adapted to abut against the first bumper when: the carriage 25 has reached the end of its travel towards the initial folding station B; the primary pushers 29 have urged a bottom blank 12*a* from the blank feeding station A to the buffer station I; and the secondary pushers 30 have urged a blank 12*b* from the buffer station I to the initial folding station B. The second carriage flange 41 is aligned in the machine direction with the second bumper 39 and is adapted to abut against the second bumper when: the carriage 25 has reached the end of its travel away from the initial folding station B; the primary and secondary pushers 29 and 30 are beneath the hopper 19 and the bottom blank 12*a* of the stack 12′ of blanks as shown in FIGS. 9 and 10; and the bottom blank 12*a* rests on the primary pusher ledges 32 and on the upper surfaces 34*a* of the secondary pusher blocks 34.

Further shown in FIGS. 8 and 9 are a first pair of smooth rigid guide rods 42, that are mounted on the frame of the apparatus 10 between the blank feeding station A and the buffer station I. The guide rods 42 extend in the machine direction, and they are located on either side of, and parallel to, the first cylinder 28 and between, and parallel to, the guide rails 21 and 22. Each carriage member 25*a* and 25*b* rides on one of the guide rods 42 towards and away from the initial folding station B.

As seen from FIGS. 4–6 and 11, the initial blank folding station B includes suction means, generally 43, for folding the side panels 13 and 14 of each flat carton blank 12*c* into a rectangular tube 11A, comprising: horizontal, upper and lower, side wall panels 13' and 13", respectively; upstanding, trailing and leading, end wall panels 14' and 14", respectively; horizontal, upper and lower, bottom side panels 15' and 15", respectively; and upstanding, trailing and leading, bottom end panels 16' and 16", respectively. As also seen from FIGS. 4–6 and 11, the initial folding station B includes means, generally 44, for folding the upstanding bottom end panels 16 of the rectangular tube 11A towards each other and normal to the end wall panels 14 and means, generally 45, for folding at least one of the horizontal bottom side panels 15 of the rectangular tube 11A towards the other bottom side panel.

As shown in FIGS. 4–6 and 11, the suction means 43 for folding the side panels 13 and 14 of the blank 12*c* includes a pair of conventional suction cups 47. The suction cups 47 are mounted on hollow tubular support arms 48, that are connected to the vacuum pump G, so that a vacuum can be provided in the hollow support arms 48 and suction cups 47. The suction means 43 also includes conventional means (not shown) for connecting and disconnecting the suction cups 47 from the vacuum pump G. The suction cups 47 are mounted on vertically opposite sides of the plane, in which the underlying guide rail surfaces 21*a* and 22*a* lie, and on vertically opposite sides of the blank 12*c* that rests on the guide rails 21 and 22 in the initial folding station B, against the guide rail limit stops 21' and 22'.

In accordance with the invention in apparatus 10, the suction cups 47 are adapted to be rotated in opposite directions about one of the guide rails 21 and 22, preferably the lower guide rail 22, and in doing so, to move towards each other and towards vertically opposite sides of the blank 12*c* in the initial folding station B. The suction cups 47 can move from positions where their open faces 47' are about 90° apart (as shown in FIG. 4) to positions where their open faces 47' are approximately 0° apart (as shown in FIG. 5). In this regard, it is preferred that each suction cup 47 can rotate 45° about the lower guide rail 22, towards the other suction cup and towards the blank 12*c*, which is 45° above horizontal. When the open faces 47' of the suction cups 47 are approximately 0° apart, one of the suction cups 47*a* is above the blank 12*c*, the other suction cup 47*b* is below the blank 12*c*, and the upper and lower suction cups, 47*a* and 47*b* respectively, contact two adjacent side and end wall panels 13 and 14 that are on vertically opposite sides of the blank 12*c* and that are contiguous to the lower guide rail 22.

The suction cups 47 also are adapted to hold by suction the two adjacent side and end wall panels 13 and 14, which they contact, and to rotate in opposite directions about the lower guide rail 22, away from each other, to positions where their open faces 47' are about 90° apart (as shown in FIG. 6) while holding the two adjacent side and end wall panels 13 and 14 by suction. In this regard, it is preferred that each suction cup 47 can rotate 45° about the lower guide rail 22, away from the other suction cup. By this rotation of the suction cups 47 away from each other, about the lower guide rail 22, the two adjacent side and end wall panels 13 and 14, contacted and held by the suction cups 47, are folded 90° apart about their foldable connection and about the lower guide rail 22, and the other side and end wall panels of the blank 12*c* are folded 90° apart about their foldable connection to form the rectangular tube 11A. Such rotational movement of the suction cups 47, about the lower guide rail 22 and relative to each other, with the two adjacent side and end wall panels 13 and 14 in the initial folding station B, is considered very important in apparatus 10 because it permits the rectangular tube 11A to be formed by machine in a simple and rapid manner from the flat blank 12*c*.

Figure 12:
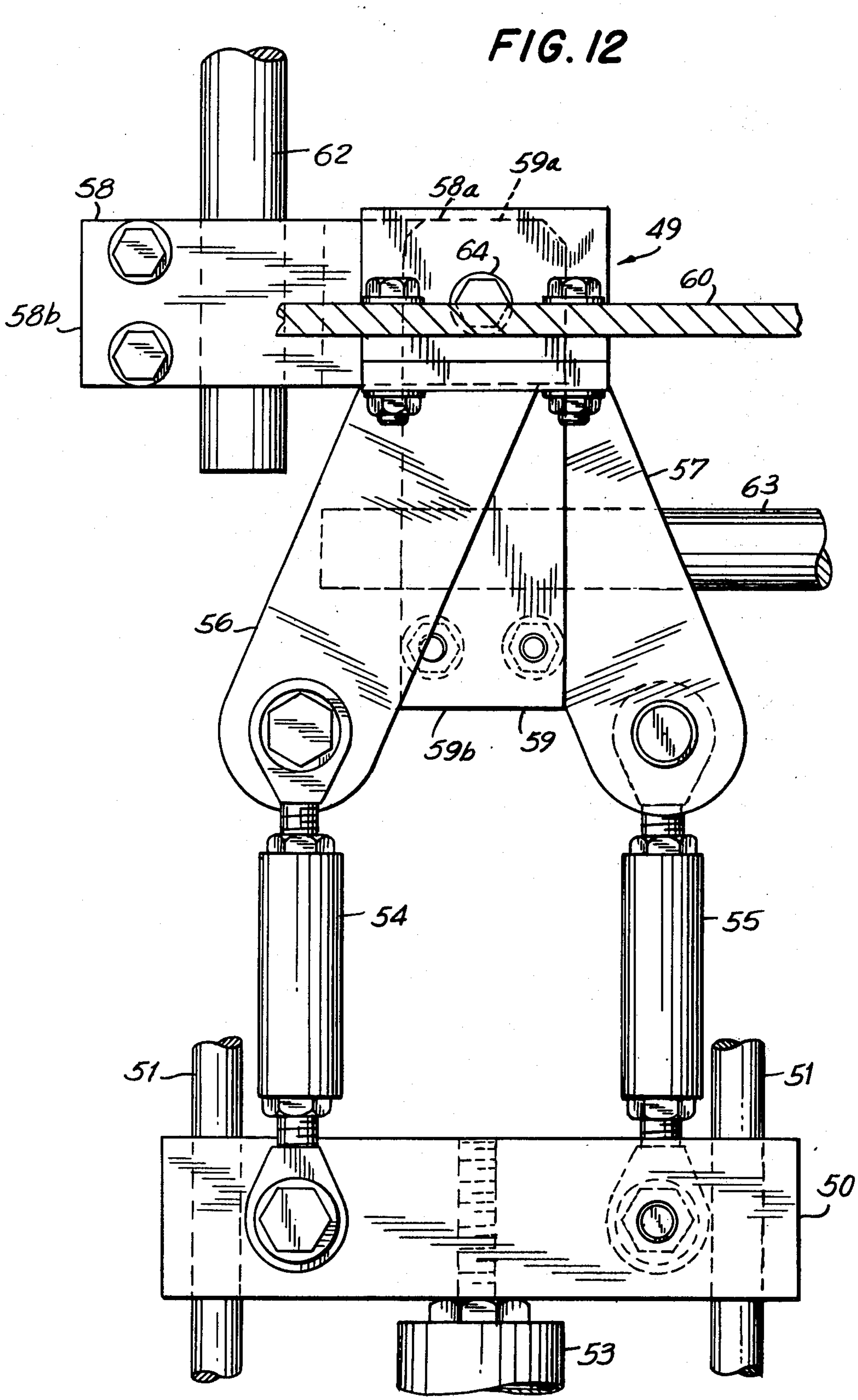
FIG. 12 is a sectional view, taken along line 12—12 in FIG. 11, showing certain principal elements that are used to control movement of the principal elements for folding the side panels of the blank to form the rectangular tube in the initial folding station, shown in FIGS. 4–6 and 11.

The means for controlling movement of the suction cups 47 from about a 90° separation (as in FIGS. 4 and 6) to an approximately 0° separation (as in FIG. 5) is not critical. However, in accordance with the invention in apparatus 10, means, generally 49, for synchronizing such movement of the suction cups 47 in response to the movement of the piston of a single double-acting air-operated cylinder is preferably provided. As shown in FIGS. 4–6, 11 and 12, the synchronizing means 49 preferably comprises a solid horizontal guide bar 50, adapted to move vertically on a vertical second pair of smooth rigid guide rods 51 in response to movement of the piston 52 of a second double-acting air-operated cylinder 53, vertically mounted on the frame of the apparatus 10. Rotatably connected to the guide bar 50, preferably on laterally opposite sides thereof, are two upstanding rigid lower link rods 54 and 55. The upper end of each lower link rod 54 and 55 is rotatably connected to an upstanding upper link rod 56 and 57. The upper end of each upper link rod 56 and 57 is rigidly connected, preferably by welding, to a rigid block 58 and 59. One end 58*a* and 59*a* of each block 58 and 59 is pivotally connected, along a common, vertically fixed line of rotation, to an angle bracket 60 and 61, which is securely attached to the frame of the apparatus 10. The upper ends of the upper link rods 56 and 57 converge towards the fixed pivotal connection of the blocks 58 and 59. The other ends 58*b* and 59*b* of the blocks 58 and 59 are free to rotate in opposite direction about the fixed pivotal connection of the blocks, preferably from positions where such free ends 58*b* and 59*b* of the blocks are about 90° apart (as shown in FIGS. 4, 6 and 12) to positions where the free ends 58*b* and 59*b* of the blocks are about 180° apart (as shown in FIG. 5). Mounted on the free end 58*b* and 59*b* of each block 58 and 59, perpendicular to the block, is one end of a rigid support shaft 62 and 63. Mounted on the other end of each support shaft 62 and 63, perpendicular to the support shaft, is one of the hollow support arms 48, connected to a suction cup 47.

As seen from FIGS. 4 and 5, the first support shaft 62, which is connected to the free end 58*b* of the first block 58 (that is horizontal in FIG. 12), is connected to the upper suction cup 47*a*, which is located above the flat blank 12*c* and horizontally closer to the lower guide rail 22 before the blank 12*c* is folded to form the rectangular tube 11A in the initial folding station B. The second support shaft 63, which is connected to the free end 59*b* of the second block 59 (that extends downwardly in FIG. 12), is connected to the lower suction cup 47*b*, which is beneath the blank 12*c* and horizontally closer to the upper guide rail 21 before the blank 12*c* is folded to form the rectangular tube 11A.

The manner of rotatably connecting the lower link rods 54 and 55 to the guide bar 50 and to the upper link rods 56 and 57, the manner of rotatably connecting the blocks 58 and 59 to the angle brackets 60 and 61, the manner of rigidly connecting the upper link rods 56 and 57 to the blocks 58 and 59, and the manner of connecting the support shafts 62 and 63 to the blocks 58 and 59 and to the hollow support arms 48 are not critical. However, it is preferred that blocks 58 and 59 be connected to angle brackets 60 and 61 by means of a shaft (not shown), through the pivoted ends 58*a* and 59*a* of the blocks, which forms a fixed pivotal connection 64 that the blocks 58 and 59 can freely rotate about and which is bolted to the angle brackets 60 and 61.

The relative dimensions and orientations of the link rods 54–57, guide bar 50, blocks 58 and 59, support shafts 62 and 63 and hollow support arms 48 also are not critical. However, as seen from FIG. 11, it is preferred that all of the moving elements 50, 52–59 and 62–63 of the means 49 for synchronizing movement of the suction cups 47 be parallel to the vertical plane through the guide rail limit stops 21' and 22' and the vertical plane in which the suction cups 47 rotate about the lower guide rail 22. It is also preferred that the hollow support arm 48 be parallel to the guide rails 21 and 22, be parallel to each other, and extend from the support shafts 62 and 63 towards the bottom panels 15 and 16 of the blank 12*c* and, beyond that, towards the top of the blank 12*c*. Moreover, as seen from FIG. 12, it is preferred that the location of the angle brackets 60 and 61 be such that, when the guide bar 50 is at its lowest point, i.e., when the piston 52 of the second cylinder 53 extends its minimum distance above the second cylinder 53, the lower link rods 54 and 55 extend vertically upward from the guide bar 50 and be substantially parallel. Furthermore, as seen from FIGS. 4–6, it is preferred that the piston 52 of the second cylinder 53 be adapted to move the guide bar 50 upwardly, when the second cylinder 53 is actuated, from: (a) the lowest position of the guide bar 50 (in FIGS. 4 and 6), wherein the open faces 47' of the suction cups 47 are about 90° apart and their support shafts 62 and 63 are about 90° apart; to (b) the highest position of the guide bar 50 (in FIG. 5), wherein the open faces 47' of the suction cups 47 are approximately 0° apart and their support shafts 62 and 63 are approximately 0° apart. In this regard, as seen from FIGS. 4, 6 and 12, it is particularly preferred that each block 58 and 59 be connected to its upper link rod 56 and 57 and its support shaft 62 and 63, so that:

(a) when the guide bar 50 is in its lowest position (as shown in FIGS. 4 and 6): (1) the first block 58 is horizontal and extends from the pivotal connection 64 towards the lower guide rail 22, (2) its first support shaft 62 extends vertically upward, away from the lower guide rail 22, (3) its first hollow support arm 48*a*, connected to the upper suction cup 47*a*, is parallel to, and located above, the lower guide rail 22, (4) the open face 47' of its upper suction cup 47*a* is above, and vertically aligned with, the lower guide rail perpendicular surface 22*b*, (5) the second block 59 extends vertically downward from the pivotal connection 64, with its free end 59*b* about 90° from the free end 58*b* of the first block 58, (6) its second support shaft 63 is horizontal and extends away from the lower guide rail 22, (7) its hollow support arm 48*b*, connected to the lower suction cup 47*b*, is parallel to, and located beneath the upper guide rail 21, and (8) the open face 47' of its lower suction cup 47*b* is below, and horizontally aligned with, the bottom of the lower guide rail perpendicular surface 22*b*; and (b) when the guide bar 50 is in its highest position (as shown in FIG. 5): (1) the first block 58 is inclined upwardly (2) the second block 59 is inclined downwardly, with its free end 59*b* about 180° from the free end 58*b* of the first block 58, (3) the support shafts 62 and 63 are upwardly inclined, parallel to, and on vertically opposite sides of, the blank 12*c*, with the first support shaft 62 being above the blank 12*c* and the second support shaft 63 being beneath the blank, (4) the hollow support arms 48 are parallel to, and on vertically opposite sides of, the blank 12*c*, with the first hollow support arm 48*a* being above the blank 12*c* and the second hollow support arm 48*b* being beneath the blank, and (5) the open faces 47' of the suction cups 47 contact the two adjacent side panels 13 and 14, on vertically opposite sides of the flat blank 12*c*, that are contiguous to the lower guide rail 22 in the initial blank folding station B, with the upper suction cup 47*a* being above the blank 12*c* and the lower suction cup 47*b* being beneath the blank.

It is considered that the distance between each support shaft 62 and 63 and the pivotal connection 64 of the blocks 58 and 59 and the angle brackets 60 and 61 is very important to the operation of the means 49 for synchronizing movement of suction cups 47. In this regard, the distance between the first support shaft 62 and the pivotal connection 64 can be varied depending upon the downward angular rotation, relative to the lower guide rail 22, required to bring the upper suction cup 47*a* into contact with the blank 12*c* in response to movement of the guide bar 50 from its lowest to its highest position with movement of the piston 52 of the second cylinder 53 from its minimum to its maximum extension outwardly of the second cylinder 53. Likewise, the distance between the second support shaft 63 and the pivotal connection 64 can be varied depending upon the upward angular rotation, relative to the lower guide rail 22, required to bring the lower suction cup 47*b* into contact with the blank 12*c* upon movement of the guide bar 50 from its lowest to its highest position. As shown in FIG. 12, the support shafts 62 and 63 preferably are equidistant from the pivotal connection 64 when the first support shaft 62 is vertical and the second support shaft 63 is horizontal in the lowest position of the guide bar 50 and when the flat blank 12*c*, resting on the guide rails 21 and 22 in the initial folding station B, is at an angle 45° above horizontal. However, if the blank 12*c* on the guide rails 21 and 22 is less than 45° above horizontal, e.g., 30° above horizontal, the second support shaft 63 should be farther, e.g., about two times farther, from the pivotal connection 64 than the first support shaft 62 in order for the upper and lower suction cups 47*a* and 47*b* to contact suitably and preferably simultaneously opposite sides of the blank 12*c*. Similarly, if the blank 12*c* is more than 45° above horizontal, e.g., 60° above horizontal, the first support shaft 62 should be farther, e.g., about two times farther, from the pivotal connection 64 than the second support shaft 63.

Shown in FIGS. 4–6 and 11 are the means 44 for folding towards each other the upstanding bottom end panels 16 of the rectangular tube 11A, formed from the flat blank 12*c* in the initial folding station B by the suction means 43. The construction of the folding means 44 is not critical, and conventional pivoted arms, actuated by double-acting air-operated cylinders, as described in U.S. Pat. No. 4,160,406, can be used to urge the bottom end panels 16 towards each other, so that they fold towards each other, through arcs of 90°, to a position where the bottom panels 16 are normal to the end wall panels 14. Preferably, as shown in FIGS. 4 to 6, the folding means 44 comprises a pair of separate, horizontally extending, rigid folding arms 65 and 66, which can move horizontally towards the bottom panels 15 and 16 of the rectangular tube 11A and, beyond that, towards the top of the rectangular tube and against the bottom end panels 16 of the rectangular tube. The first folding arm 65 is adapted to fold the upstanding trailing bottom end panel 16' of the rectangular tube 11A, and the second folding arm 66 is adapted to fold the upstanding leading bottom end panel 16" of the rectangular tube.

As best seen in FIG. 5, the first folding arm 65 is located above the lower guide rail 22 and is rigidly mounted on one end, preferably the top, of a vertical shaft 67, rotatably mounted on the frame of the apparatus 10, adjacent the lower guide rail 22. A rigid radial arm 68 is provided on the other end, preferably the bottom, of the shaft 67. Rotatably connected to the radial arm 68 is the piston 69 of a third double-acting air-operated cylinder 70, horizontally mounted on the frame of the apparatus 10. The piston 69 of the third cylinder 70 is adapted to move horizontally the radial arm 68 of the vertical shaft 67, causing the shaft 67 to rotate and causing the first folding arm 65 to rotate horizontally against the trailing bottom end panel 16', when the third cylinder 70 is actuated.

As best seen in FIG. 6, one end of the second folding arm 66 is pivotally mounted beneath the upper guide rail 21. The other end of the second folding arm 66 extends towards the lower guide rail 22 and preferably is bifurcated. The piston 71 of a fourth double-acting air-operated cylinder 72, horizontally mounted on the frame of the apparatus 10, is connected to the second folding arm 66, between its ends. The piston 71 of the fourth cylinder 72 is adapted to move the bifurcated end of the second folding arm 66 horizontally against the leading bottom end panel 16" when the fourth cylinder 72 is actuated.

Preferably, as shown in FIGS. 6 and 11, the second folding arm 66 is pivotally connected to a rigid horizontal support arm 73, which is mounted on, and spaced above, a rigid flat horizontal table 74. The table 74 is securely attached to the frame of the apparatus 10. The table 74 underlies the lower guide rail 22 and the first and second folding arms 65 and 66 in the initial folding station B. As a result, the table 74 supports the lower portions of the blank 12c in the initial folding station B, and it also supports the rectangular tube 11A in the initial folding station B, as well as in the adhesive applying station C, the final folding station D and the bottom bonding station E. Preferably, as seen from FIG. 11, the bottom of the perpendicular surface 22b of the lower guide rail 22 rests on the top of the table 74.

Shown in FIGS. 4, 6 and 11 is the means 45 for folding at least one of the horizontal bottom side panels 15 of the rectangular tube 11A towards the other bottom side panel 15 in the initial folding station B. In accordance with this invention, the upper bottom side panel 15' is preferably folded towards the lower bottom side panel 15" by the folding means 45, so that the upper bottom side panel 15' overlies the bottom end panels 16 and keeps them folded towards each other. Thereby, the rectangular tube 11A is made stable, so that it will not collapse when it is moved from the initial folding station B to the adhesive applying station C and the final folding station D.

As best seen in FIGS. 4 and 6, the preferred folding means 45 comprises an upstanding rigid third folding arm 75, extending above the rectangular tube 11A. The lower end of the third folding arm 75 is pivotally mounted on the frame of the apparatus 10, above the table 74. The upper end of the third arm 75 is adapted to rotate about its lower end and to move horizontally, in the cross-direction, towards the bottom panels 15 and 16 of the rectangular tube 11A and, beyond that, towards the top of the rectangular tube and to move downwardly towards the upper side wall panel 13' of the rectangular tube. Preferably, a pair of horizontal parallel elongated rigid bars 76 and 77 are securely mounted on the side of the third arm 75, closest to the rectangular tube 11A. The bars 76 and 77 are at right angles to the third arm 75 and extend in the machine direction, between the initial folding station B and the final folding station D. The first bar 76 is spaced from the upstanding end of the third arm 75, and the second bar 77 is on the upstanding end of the third arm 75.

The lower first bar 76 on the third folding arm 75 is adapted to press the horizontal upper bottom side panel 15' downwardly, towards the lower bottom side panel 15", when the upper end of the third arm 75 moves downwardly towards the upper side wall panel 13', so as to fold the upper bottom side panel 15' towards the lower bottom side panel 15", and to prevent the upper bottom side panel 15' from subsequently springing back, away from the lower bottom side panel 15", as the rectangular tube 11A is moved from the initial folding station B to the final folding station D.

The specific angle that the upper bottom side panel 15' is folded downwardly towards the lower bottom side panel 15" by the first bar 76 is not critical. However, the angle of fold preferably is great enough, so that the upper bottom side panel 15' need not subsequently be folded further and yet it can subsequently be urged against the bottom end panels 16 simply by pressing the folded bottom panels 15 and 16 together. In this regard, the angle of fold, effected by the first bar 76, preferably is 30° or greater, especially about 45°.

The upper second bar 77 on the third folding arm 75 is adapted to press downwardly on the horizontal upper side wall panel 13' of the rectangular tube 11A, when the upper end of the third arm 75 moves downwardly towards the upper side wall panel 13', so that the lower side wall panel 13" of the rectangular tube stays on the table 74 and does not move significantly in the cross-direction as the rectangular tube is moved from the initial folding station B to the final folding station D.

Connected to opposite lateral sides of the third folding arm 75, at its lower end, are a pair of fixed pins 78. The first pin 78' is rotatably connected to the frame of the apparatus 10. The second pin 78" is connected to means for rotating it, together with the third folding arm 75, towards the bottom panels 15 and 16 of the rectangular tube 11A. As shown in FIGS. 6 and 11, the means for rotating the second pin 78" and the third arm 75 preferably includes a fifth double-acting air-operated cylinder 79, mounted on the frame of the apparatus and extending downwardly towards the bottom panels 15 and 16 of the rectangular tube 11A and, beyond that, towards the top of the rectangular tube 11A, and means for adjustably connecting the piston 80 of the fifth cylinder 79 to the second pin 78".

While the means of connecting the piston 80 of the fifth cylinder 79 to the second pin 78" is not critical, it is preferred that one end of a rigid block 81 be rotatably connected to the free end of the piston 80, that the other end of the block 81 be non-rotatably connected to the second pin 78", and that the end of the block 81, rotatably connected to the piston 80, be closer to the rectangular tube 11A than the end of the block 81, connected to the second pin 78". Thereby, the block 81 can serve to translate downward movement of the piston 80, in response to actuation of the fifth cylinder 79, into rotational movement of the block 81 and the third folding arm 75 towards the bottom panels 15 and 16 of the rectangular tube 11A and, beyond that, towards the top of the rectangular tube.

Figure 13:
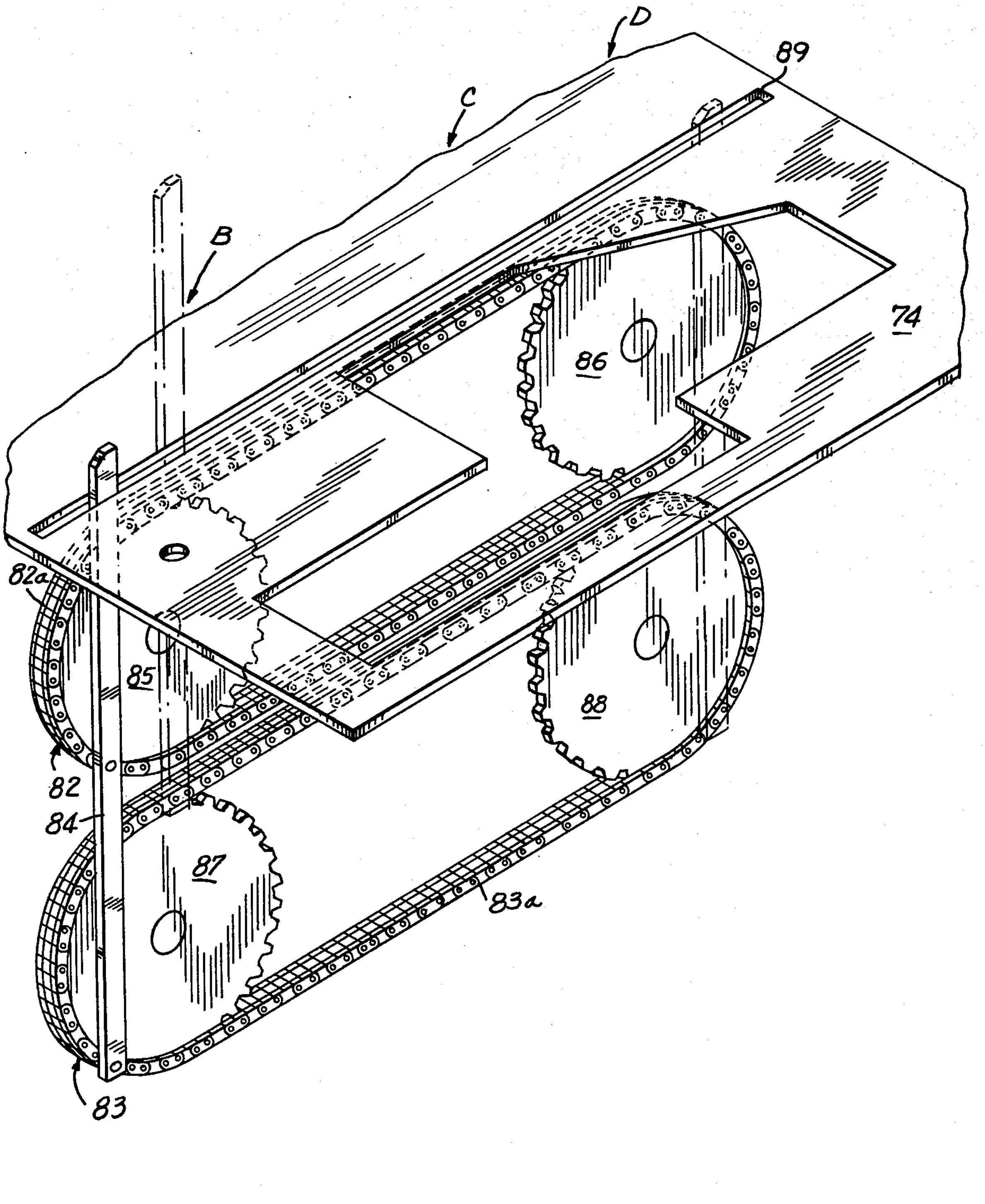
FIG. 13 is a fragmentary perspective view of certain principal elements, including a pusher bar, used to move the rectangular tube from the initial folding station through the adhesive applying station and the final folding station to the bottom bonding station of the apparatus of FIG. 1.

As shown in FIGS. 4, 6, 11 and 13, means are provided for automatically moving the rectangular tube 11A on the table 74 from the initial folding station B to the adhesive applying station C, the final folding station D and, finally, the bottom bonding station E of the apparatus 10. While the means utilized for moving the rectangular tube 11A is not critical, it is preferred that, as shown in FIG. 13, such means comprises: a pair of parallel, vertically aligned, chain drives, generally 82 and 83, beneath, and at right angles to, the table 74; and an upstanding vertical pusher bar 84, which is pivotally connected at a middle point to the chain **82*a* of the upper chain drive 82 and is pivotally connected at a lower point to the chain 83*a* of the lower chain drive 83**.

Each chain **82*a* and 83*a* is wound about a pair of sprockets 85, 86 and 87, 88. The sprockets 85–88 are mounted on the frame of the apparatus 10 in a conventional manner and are of the same diameter. The sprockets 85–88 are connected to the electric motor H, which rotates the sprockets, to drive the chains 82*a* and 83*a* and the pusher bar 84. The chain drives 82 and 83 preferably circumscribe vertical areas of substantially equal length and height, the height of each circumscribed area being equal to the diameter of the sprockets 85–88. The vertical distance between the points of pivotal connection of the pusher bar 84 and the chain drives 82 and 83 is preferably equal to the vertical distance between the tops of the chain drives 82 and 83, i.e., the tops of the sprockets 85–88** of the chain drives.

Each chain **82*a* and 83*a* travels between the initial folding station B and the final folding station D, preferably in a horizontal direction, i.e., the machine direction, that is at a right angle to the guide rails 21 and 22 as shown in FIGS. 4, 6, 7 and 13. The movement of the chain drives 82 and 83, which carry pusher bar 84, is preferably synchronized in a conventional manner with the completion of the folding, adhesive applying, and bottom bonding operations in stations B, C, D and E of the apparatus 10**.

As seen from FIGS. 6, 7 and 13, a narrow slot 89 is provided in the table 74, extending in the machine direction and at a right angle to the guide rails 21 and 22. The top of the pusher bar 84 extends above the top of the table 74, through the slot 89, when the pusher bar is moving from the initial folding station B to the final folding station D. This is because the pivotal connections between the pusher bar 84 and the chains **82*a* and 83*a* are then located on the upper portions of the chain drives 82 and 83. When the pusher bar 84 extends above the table 74, the pusher bar is adapted to move a rectangular tube 11A along the top of the table 74 from the initial folding station B to the bottom bonding station E. During the return trip of the pusher bar 84 from the final folding station D to the initial folding station B, the pivotal connections between the pusher bar and the chains 82*a* and 83*a* are located on the lower portions of the chain drives 82 and 83. Hence, the top of the pusher bar 84 is below the top of the table 74 during its return trip, and its return trip does not interfere with any blank 12*c*** which may be located in the initial folding station B at the time.

As seen from FIGS. 6 and 7, the adhesive applying station C includes a conventional gluing head 90, mounted on the frame of the apparatus 10. The gluing head 90 is adapted to spray an adhesive 91, such as a hot melt adhesive, on the exposed bottom surfaces of the upstanding folded bottom end panels 16 as the rectangular tube 11A is moved by the pusher bar 88 past the gluing head 90 towards the final folding station D. The gluing head 90 utilized is not critical and can be any commercially available device, such as a Nordson Model A, which has four nozzles, capable of spraying hot melt adhesive from a glue reservoir (not shown) in a pre-determined pattern on the facing surfaces of the bottom end panels 16.

As also seen from FIGS. 6 and 7, the final blank folding station D comprises a pair of conventional, vertically aligned, stationary rigid plows 93 and 94. The lower plow 93 is adapted to urge the horizontal lower bottom side panel 15" of the rectangular tube 11A upwardly towards the previously folded, upper bottom side panel 15' as the rectangular tube 11A is moved by the pusher bar 88 past the lower plow 93, so as to fold the lower bottom side panel 15" towards the upper bottom side panel 15'. The upper plow 94 is preferably adapted only to prevent the previously folded, upper bottom side panel 15' from springing back, away from the lower bottom side panel 15", as the rectangular tube 11A is moved past the upper plow 94 in the final folding station D. However, the upper plow 94 can, if desired, be adapted to urge the upper bottom side panel 15' further downwardly, towards the lower bottom side panel 15", as the rectangular tube 11A is moved past the upper plow 94, so as to further fold the upper bottom side panel 15' towards the lower bottom side panel 15".

The size and construciton of the plows 93 and 94 are not critical, so long as the bottom plow 93 extends upwardly from the top of the table 74, so that it can fold the previously unfolded, lower bottom side panel 15". It is preferred, however, that the plows 93 and 94 be angled somewhat vertically and horizontally towards the center line of the folded bottom end panels 16 in the machine direction of the apparatus 10. It is also preferred that the length of the upper plow 94 be such that the horizontal distance in the machine direction between the lower first bar 76 on the third folding arm 75 and the upper plow 94 and the horizontal distance in the machine direction between the upper plow 94 and the bottom sealing station E be significantly less than the distance between the leading and trailing, end wall panels 14 of the rectangular tube 11A. This assures that the upper bottom side panel 15', as well as the underlying bottom end panels 16, of the rectangular tube 11A cannot unfold before the tube 11A reaches the bottom bonding station E.

Likewise, the specific angle that the lower bottom side panel 15" is folded upwardly by the lower plow 93 is not critical, so long as the lower bottom side panel 15" can subsequently be urged against the bottom end panels 16 simply by pressing the folded bottom panels 15 and 16 together. In this regard, as was the case for the upper bottom side panel 15', the angle of fold of the lower bottom side panel 15" is preferably 3020 or more, especially about 45°.

As shown in FIG. 7, the bottom bonding station E, wherein the bottom panels 15 and 16 of the rectangular tube 11A are adhesively bonded together to form the complete erect carton 11, preferably comprises only previously known elements, such as the elements described in U.S. Pat. No. 4,160,406. In this regard, the preferred bottom bonding station E includes upper and lower squaring stops (not shown), mounted on the frame of the apparatus 10. The squaring stops are adapted to engage the leading corners of the top of the rectangular tube 11A as the rectangular tube is moved into the bottom bonding station E, so as to align vertically the leading and trailing, end wall panels 14 of the rectangular tube. The preferred bottom bonding station E also includes an upstanding platen 95, connected to the piston (not shown) of a horizontal sixth double-acting air-operated cylinder 96, and a rigid upstanding anvil 97, parallel to the platen 95.

The piston of the sixth cylinder 96 is adapted to move the platen 95 horizontally, in the cross-direction of the apparatus 10, towards the anvil 97, through the top of the rectangular tube 11A and then against the inner surfaces of the bottom end panels 16, upon actuation of the sixth cylinder 96. Such movement of the platen 95 causes the rectangular tube 11A to be moved horizontally a short distance in the cross-direction of the apparatus 10 and causes the bottom side panels 15 of the rectangular tube to be urged against the anvil 97. Such movement of the rectangular tube 11A against the anvil 97, caused by the platen 95, is effective to press the bottom panels 15 and 16 together, so as to adhesively bond them, and also to move the leading corners of the top of the rectangular tube in the cross-direction, with the moving platen 95, so that the top leading corners of the rectangular tube are moved clear of the squaring stops.

The dimensions of the elements of the bottom bonding station E are not critical. However, it is preferred that the horizontal distance, in the cross-direction, between the platen 95 and the anvil 97 be significantly less than the distance between the top edges of the side panels 13 and 14 and the bottom edges of the bottom panels 15 and 16 of the rectangular tube 11A. This assures that the bottom side panels 15′ and 15″, folded in the folding stations B and D, will not significantly spring back and unfold in the bottom bonding station E.

As also shown in FIG. 7, the bottom bonding station E is preferably provided with a conventional sensor 98. The sensor 98 is adapted to signal a control means (not shown), connected to the sixth cylinder 96, for coordinating the actuation of the sixth cylinder 96 and the movement of the platen 95 towards the anvil 97 with the introduction of the rectangular tube 11A into the bottom bonding station E.

As further shown in FIGS. 1 and 7, the final folding station D and the bottom bonding station E preferably include a third rigid horizontal bar 99, mounted on the frame of the apparatus 10 above the table 74. The third bar 99 extends in the machine direction and is adapted to press downwardly on the horizontal upper side wall panel 13′ of the rectangular tube 11A, so that the lower side wall panel 13″ of the rectangular tube stays on the table 74 and does not move significantly in the cross-direction as the rectangular tube is moved through the final folding station D and into the bottom bonding station E. In this regard, the bar 99 is preferably spring-loaded, so that the bar exerts only a slight continuous downward pressure on the upper side wall panel 13′ of the rectangular tube. The dimensions of the third bar 99 are not critical, but it is preferred that the horizontal distance in the machine direction between the third bar 99 and the upper second bar 77 on the third folding arm 75 be significantly less than the distance between the leading and trailing, end wall panels 14 of the rectangular tube 11A. This assures that the upper side wall panel 13′ of the rectangular tube 11A is continuously pressed downwardly towards the table 74 between the initial folding station B and the bottom bonding station E.

As also shown in FIGS. 1 and 7, means F are preferably provided in apparatus 10, adjacent the bottom bonding station E, for automatically conveying completed erect cartons 11 away from the apparatus 10. In this regard, the conveying means F can simply comprise a conventional metal conveyor 100, inclined downwardly away from the bottom bonding station E.

As further shown in FIGS. 4, 6 and 11, a third spring-loaded bumper 101 is preferably mounted horizontally on the frame of the apparatus 10. The third bumper 101 serves as a shock absorber at the end of travel of the third folding arm 75, away from the rectangular tube 11A. The third bumper 101 is adapted to abut against a flange 102 on the third folding arm 75 when the third folding arm 75 has reached the end of its travel away from the rectangular tube 11A.

The operation of the apparatus 10 of this invention, as shown in FIGS. 1–13, initially involves individually feeding the bottom blank **12*a* from the stack 12′ of flat carton blanks 12 in the hopper 19 of the blank feeding station A to the initial blank folding station B, via the buffer station I, along the guide rails 21 and 22. The blanks 12 in the hopper 19 are upwardly inclined in the cross-direction of the guide rails 21 and 22. The blanks 12 in the hopper 19 also are arranged with the foldably connected edges of their side panels 13 and 14 extending in a direction parallel to the guide rails 21 and 22 and with their bottom panels 15 and 16 preferably being closer than their side panels 13 and 14 to the initial folding station B. As shown in FIG. 8, the upper portions of the bottom blank 12*a* slide atop the underlying surface 21*a* of the upper guide rail 21, and the lower portions of the bottom blank 12*a* slide atop the underlying surface 22*a* of the lower guide rail 22, with the lower edge of the bottom blank 12*a* sliding along the perpendicular surface 22*b* of the lower guide rail 22. The bottom blank 12*a* is moved on the guide rails 21 and 22 initially by the primary pushers 29 and then by the secondary pushers 30 on the upwardly inclined carriage 25**.

When being moved between the blank feeding station A and the buffer station I, the bottom blank **12*a* rests on top of each primary pusher ledge 32 and on the top 34*a* of each secondary pusher block 34 of the carriage 25 as shown in FIGS. 9 and 10. Upon actuation of the horizontal first double-acting air-operated cylinder 28, its piston 27 urges carriage 25 from the blank feeding station A towards the initial folding station B along the first pair of guide rods 42. This movement of the carriage 25 causes the bottom blank 12*a* to be pushed on the guide rails 21 and 22, out from under the stack 12′ of blanks in the hopper 19, under the bottom 24 of the blank stop 23, and under the flexible restraining members 37 in the buffer station I by the side 31*b* of each primary pusher block 31, on which the primary pusher ledge 32 is mounted. After the bottom blank 12*a* has been moved in this manner by the primary pushers 29 into the buffer station I (where the blank is referred to as blank 12b), the carriage 25 reaches the end of its travel towards the initial folding station B, and the first depending carriage flange 40, on the lower carriage member 25b, abuts against the first spring-loaded bumper 38**.

Because the stack 12', of blanks 12 is upwardly inclined in the cross-direction, the pressure exerted by the weight of the stack 12' of blanks on the carriage 25 is significantly reduced. This is because most of the weight of the stack 12' is supported by the lower guide rail 22 and the lower side 19a of the inclined hopper 19. Hence, the weight of the stack 12' of blanks 12 does not interfere with the movement of the carriage 25 with the bottom blank 12a of the stack, and the sliding friction between the bottom blank 12a and the underlying guide rail surfaces 21a and 22a, beneath the stack 12', is significantly reduced.

After the bottom blank 12a has been fed by the carriage 25 to the buffer station I, the first cylinder 28 is actuated again to retract its piston 27 and to move the carriage 25, with its pairs of primary and secondary pushers 29 and 30, back to the blank feeding station A, beneath the hopper 19, where the carriage 25 reaches the end of its travel away from the initial folding station B and the second depending carriage flange 41 abuts against the second spring-loaded bumper 39. During this movement by the carriage 25, back to the blank feeding station A, the secondary pusher blocks and fingers 34 and 36 pivot downwardly as the fingers 36 contact the blank 12b in the buffer station I. As a result of such contact, the secondary pusher fingers 36 are urged horizontally, in the machine direction, towards the initial folding station B and downwardly towards the carriage 25 by the blank 12b which is frictionally restrained from moving by the flexible restraining members 37. Thereby, the secondary pusher fingers 36 pass beneath the blank 12b in the buffer station I and avoid moving the blank 12b back towards the blank feeding station A when the secondary pushers 30 and the carriage 25 move back towards the blank feeding station A.

When the operation is repeated by actuating the first cylinder 28 again to move the carriage 25 towards the initial folding station B, another bottom blank 12a from the stack 12' of blanks is moved on the guide rails 21 and 22 by the primary pusher blocks 31 from the hopper 19 of the blank feeding station A to the buffer station I. At the same time, the secondary pusher fingers 36 contact the blank 12b, already in the buffer station I, and move it out from under the flexible restraining members 37, on the guide rails 21 and 22, to the initial blank folding station B (where the blank is referred to as blank 12c). In this regard, the secondary pusher fingers 36 move the blank 12c in the machine direction until movement of the carriage 25 is stopped because the carriage 25 reaches the end of its travel towards the initial folding station B, where the first carriage flange 40 abuts against the first bumper 38 and the bottom panels 15 and 16 of the blank 12c abut against the limit stops 21' and 22' at the ends of the guide rails 21 and 22 in the initial folding station B. In accordance with this invention, the blank 12c is accurately positioned automatically in the initial folding station B. This is because the lower edge of the blank 12c rests upon the table 74 and abuts against the perpendicular surface 22b of the lower guide rail 22 and the blank 12c is positioned against the guide rail limit stops 21' and 22' as shown in FIGS. 4 and 11.

When the blank 12c reaches the initial folding station B, the vertical second double-acting air-operated cylinder 53 is actuated, causing its piston 52 to move upwardly towards the blank 12c as shown in FIG. 5. Such movement of the piston 52 causes the pair of suction cups 47 to rotate about the lower guide rail 22, so that the suction cups 47 move towards each other and towards vertically opposite sides of the blank 12c. This movement continues until both suction caps contact the two adjacent side and end wall panels 13 and 14 of the blank 12c, that are contiguous to the lower guide rail 22 and on vertically opposite sides of the blank.

Such synchronized movement of the suction cups 47, in response to upward movement of the piston 52 of the second cylinder 53, results from upward movement of the guide bar 50 along the second pair of guide rods 51, which causes each lower link rod 54 and 55 to rotate, so that the rotatable connections of the upper and lower link rods 54–57 diverge. Such divergence of the connections between the lower and upper link rods 54–57 causes the upper link rods 56 and 57 to rotate, which causes the free ends 58b and 59b of the blocks 58 and 59 to rotate in opposite directions, from positions about 90° apart (as in FIGS. 4 and 12) to positions about 180° apart (as in FIG. 5), about the pivotal connection 64 between the blocks 58 and 59 and the angle brackets 60 and 61. The pivoting of the blocks 58 and 59 in opposite directions, in response to upward movement of the guide bar 50, causes the support shafts 62 and 63 and the hollow support arms 48 to rotate towards each other about the pivotal connection 64. Such rotation of the support arms 48 causes the suction cups 47 to rotate about 90° towards each other about the lower guide rail 22 from positions where the open faces 47' of the suction cups 47 are about 90° apart (as in FIG. 4) to positions where the open faces 47' of the suction cups 47 are approximately 0° apart (as in FIG. 5). When the suction cups 47 are approximately 0° apart, they are on vertically opposite sides of the blank 12c, with one of the suction cups 47a being on top of, and in contact with, an end wall panel 14, contiguous to the lower guide rail 22, and the other suction cup 47b being beneath, and in contact with, a side wall panel 13, contiguous to the lower guide rail 22, as shown in FIG. 5.

When the suction cups 47 contact the adjacent end wall panel 14 and side wall panel 13 on opposite sides of the blank 12c *i*n the initial folding station B, the vacuum pump G is connected to the suction cups 47 via their hollow support arms 48. This causes a vacuum to be provided in the suction cups 47, so that the suction cups securely grasp the two contacted side and end wall panels 13 and 14.

Then, the second cylinder 53 is actuated again, so that its piston 52 moves downwardly. This causes the guide bar 50 to move downwardly and the rotatable connections between the lower link rods 54 and 55 and the upper link rods 56 and 57 to converge. As a result, the blocks 58 and 59 rotate in opposite directions about their pivotal connection 64 with the angle brackets 60 and 61, from positions about 180° apart to positions about 90° apart. Thereby, the support shafts 62 and 63 and the support arms 48 rotate away from each other about the pivotal connection 64. This causes the suction cups 47 to rotate about 90° away from each other, about the lower guide rail 22, back to positions (as in FIG. 6) wherein the open faces 47' of the suction cups 47 are about 90° apart. Such rotational movement of the suction cups 47, while they continue to hold by suction the two contacted side and end wall panels 13 and 14, folds the two contacted side and end wall panels 90° apart about their foldable connection and about the lower guide rail 22. This causes the other side and end wall panels 13 and 14 to be folded 90° apart about their foldable connection and thereby causes the blank 12c to be folded into the rectangular tube 11A.

As folded by the suction cups 47, the rectangular tube 11A has an upstanding trailing end wall panel 14' and a horizontal lower side wall panel 13" that are contiguous to the lower guide rail 22 and that are held by the suction cups 47. The rectangular tube 11A also has an upstanding leading end wall panel 14" and a horizontal upper side wall panel 13' that are below, and no longer contiguous to, the upper guide rail 21. In this regard, the lower side wall panel 13" of the rectangular tube rests on the table 74, and the leading end wall panel 14" no longer rests on the upper guide rail 21.

Then, the horizontal third double-acting air-operated cylinder 70 is actuated, causing its piston 69 to move the radial arm 68 on the vertical shaft 67 horizontally. This causes the shaft 67 to rotate and causes the first folding arm 65, mounted on the shaft 67, to rotate horizontally against the upstanding trailing bottom end panel 16' of the rectangular tube 11A, so that the trailing bottom end panel 16' is folded towards the leading bottom end panel 16" to a position normal to the trailing end wall panel 14'.

Then, the horizontal fourth double-acting air-operated cylinder 72 is actuated, causing its piston 71 to move the second folding arm 66 horizontally against the upstanding leading bottom end panel 16" of the rectangular tube 11A. This causes the leading bottom end panel 16" to be folded towards the trailing bottom end panel 16' to a position normal to the leading end wall panel 14".

Thereafter, the downwardly-extending fifth double-acting air-operated cylinder 79 is actuated, causing its piston 80 to be urged downwardly. This causes the block 81 to rotate towards the bottom panels 15 and 16 of the rectangular tube 11A, together with the second pin 78" and the third folding arm 75, so that the upper end of the third folding arm 75 rotates downwardly towards the upper side wall panel 13' until the upper second bar 77 on the upper end of the third arm 75 abuts against the upper side wall panel 13' as shown in FIG. 6. During such rotational movement of the third arm 75 towards the rectangular tube 11A, the lower first bar 76 on the third arm 75 contacts the horizontal upper bottom side wall panel 15' of the rectangular tube 11A and urges it downwardly, causing the upper bottom side wall panel 15' to be folded, preferably about 30° or more, especially about 45°, towards the horizontal lower bottom side wall panel 15", so that the upper bottom side panel 15' and the upper side wall panel 13' can fit between the platen 95 and the anvil 97 of the bottom bonding station E.

Preferably, while the three folding arms 65, 66 and 75 are folding the leading and trailing, bottom end panels 16 and the upper bottom side panel 15' of the rectangular tube 11A in the initial folding station B, the vacuum pump G is connected to the suction cups 47, so that the rectangular tube is held in place by the suction cups. After the leading and trailing, bottom end panels 16 and the upper bottom side panel 15' have been folded, the vacuum pump G is disconnected from the suction cups 47, so that the vacuum in the suction cups is relieved. Thereby, the suction cups' grip on the trailing end wall panel 14' and the lower side wall panel 13" of the rectangular tube is released.

Then, rotation of the parallel chain drives 82 and 83 causes the upstanding vertical pusher bar 84 to be carried by the upper portions of the chain drives. This causes the top of the pusher bar 84 to move upwardly through the slot 89 in the table 74, through a gap 103 in the lower guide rail 22, and then to move about the top of the table 74 against the trailing end wall panel 14' of the rectangular tube 11A, above the slot in the table. As a result, the rectangular tube is moved by the pusher bar 84 along the slot 89 from the initial folding station B towards the adhesive applying station C and the final folding station D of the apparatus 10 as shown in FIG. 7. Preferably, such movement of the rectangular tube is in a direction at a right angle to the movement of the blanks 12*a*, 12*b* and 12*c* along the guide rails 21 and 22.

During movement of the rectangular tube 11A towards the adhesive applying station C and the final folding station D under the influence of the pusher bar 84, the first and second bars 76 and 77 on the third folding arm 75 continue to press downwardly on the upper bottom side panel 15' and the upper side wall panel 13', respectively, of the rectangular tube. This keeps the rectangular tube 11A stable during such movement. In this regard, the lower first bar 76 keeps the upper bottom side panel 15' from unfolding and thereby prevents the underlying bottom end panels 16 from unfolding, which could cause the rectangular tube to collapse. The upper second bar 77 presses down on the upper side wall panel 13' to keep the rectangular tube 11A from moving in the cross-direction on the table 74 as it is moved by the pusher bar 84 through the adhesive applying station C and into the final folding station D. In this regard, the air pressure in the fifth cylinder 79 preferably is such that the downward pressure exerted by the second bar 77 agains the upper side wall panel 13' is sufficient to prevent the rectangular tube from moving significantly in the cross-direction but is not excessive, so that the rectangular tube is not crushed by the second bar 77.

If desired, a subsequent flat carton blank 12c can be moved into the initial folding station B, while the rectangular tube 11A, formed from the previous blank 12c, is being moved towards the adhesive applying station C—without waiting for the rectangular tube to be moved all the way out of the initial folding station. In this regard, it is only necessary, when moving the subsequent blank 12c nto the initial folding station B, that the upper side wall panel 13' of the rectangular tube 11A be moved far enough towards the adhesive applying station C, so that it does not intersect the plane of the underlying guide rail surfaces 21a and 22a in the initial folding station B.

The rectangular tube 11A is moved by the pusher bar 84 from the initial folding station B through the adhesive applying station C. In the adhesive applying station C, the bottom end panels 16 of the rectangular tube pass in close proximity to the gluing head 90, and an adhesive 91, such as a conventional hot melt adhesive, is sprayed by the gluing head 90 on the exposed adjacent surfaces of the bottom end panels 16.

Thereafter, the rectangular tube 11A is moved through the final blank folding station D. As the rectangular tube moves through the final folding station D, the lower bottom side panel 15" is folded upwardly towards the previously folded, upper bottom side panel 15' by the lower plow 93. At the same time, the upper bottom side panel 15' is held in its folded condition or optionally further folded downwardly towards the lower bottom side panel 15″ by the upper plow 94. As the lower bottom side panel 15″ of the rectangular tube is folded in the final folding station D, the rectangular tube is held on the table 74 by the third horizontal bar 99, so that the rectangular tube does not move significantly in the cross-direction. Preferably, in the final folding station D, the upper bottom side panel 15′ is not folded further, and the lower bottom side panel 15″ is folded upwardly only to about the same extent as the upper bottom side panel 15′ was folded downwardly in the initial folding station B, preferably about 30° or more, especially about 45°, so that the lower bottom side panel 15″ and the lower side wall panel 13″ can fit between the platen 95 and the anvil 97 of the bottom bonding station E.

Then, the pusher bar 84 urges the rectangular tube 11A into the carton bottom bonding station E of apparatus 10, preferably so that the top leading corners of the rectangular tube engage squaring stops (not shown) on the frame of the apparatus and the bottom edges of the folded bottom side panels 15′ and 15″ engage the anvil 97 to hold down the upper bottom side panel 15′ and hold up the lower bottom side panel 15″ as shown in FIG. 7. As it is moved into the bottom bonding station E, the rectangular tube activates the sensor 98 which provides a signal to means (not shown) for actuating the horizontal sixth double-acting air-operated cylinder 96.

After the pusher bar 84 urges the rectangular tube 11A into the bottom bonding station E, the pusher bar is carried by rotation of the chain drives 82 and 83 to the lower portions of the chain drives. This causes the top of the pusher bar 84 to move downwardly through the slot 89 and below the top of the table 74. Then, the pusher bar 84 moves beneath the table 74 from the final folding station D to the initial folding station B, where the pusher bar picks up the next rectangular tube 11A.

In the bottom bonding station E, actuation of the sixth cylinder 96 causes its piston to move the platen 95 in the cross-direction against the inner surfaces of the bottom end panels 16 of the rectangular tube 11A. This causes the rectangular tube to be moved a short distance in the cross-direction against the rigid anvil 97, thereby pressing the bottom panels 15 and 16 between the platen and the anvil 95 and 97. Movement of the rectangular tube in the cross-direction also causes the top leading corners of the rectangular tube to be disengaged from the squaring stops.

The sixth cylinder 96 causes the bottom panels 15 and 16 of the rectangular tube 11A to be pressed together between the platen 95 and the anvil 97 under sufficient pressure and for a sufficient time, so that the adhesive 91 on the bottom end panels 16 securely adheres the bottom panels 15 and 16 together to form the completed erect carton 11.

After the bottom of the carton 11 has been adhesively bonded together, the sixth cylinder 96 is actuated again, so that the platen 95 is retracted from within the completed carton 11. Then, the carton 11 is ejected from the bottom bonding station E on to means F for conveying the carton 11 away from the apparatus 10. Such ejection of the carton is preferably caused by the next rectangular tube 11A, being urged into the bottom bonding station E by the pusher bar 84.

The apparatus 10 of this invention is preferably provided with conventional means for adjusting the relative positions of its principal elements, so that cartons 11 and blanks 12 of varying sizes can be suitably accommodated. In this regard, means are preferably provided for adjusting the spacing: between the hopper guides 20; between the upper and lower guide rails 21 and 22; between the bottom 24 of the blank stop 23 and the top of the bottom blank 12a in the stack 12′ of blanks in the hopper 19; between the gluing head 90 and top of the table 74; and between the table 74 and the third horizontal bar 99; as well as the preset angle of block 81 relative to the third folding arm 75 about the second pin 78″. The apparatus 10 also is provided with conventional means for securely attaching the principal elements of the apparatus 10 to its frame (not shown).

The materials, from which the principal elements of the apparatus 10 are constructed, are not critical, and conventional materials, such as steel, generally can be suitably utilized.

The six double-acting air-operated cylinders 28, 53, 70, 72, 79 and 96 and the pistons mounted within them 27, 52, 69, 71, and 80 also are conventional and are operated by air pressure, supplied by the air compressor (not shown). Likewise, the two suction cups 47 are conventional and utilize suction provided by the vacuum pump G.

It will be apparent from the preceding description that the various operations of the apparatus 10 must be performed in a timed sequence. In this regard, the apparatus 10 can suitably include conventional electrical and mechanical controls for timing its operations, such as a series of cam operated switches to provide timed control signals to actuate valves, used to control the various double-acting air-operated cylinders and suction cups. As such controls are well known, it is deemed unnecessary to describe them in detail.

As used throughout this detailed description, terms such as "leading", "trailing", "vertical", "horizontal", "upward", "downward", "upper" and "lower" are relative terms, used in connection with the apparatus 10, the carton 11 and blank 12, shown in FIGS. 1 to 13. Such terms are not to be construed as limiting the spatial relationship in the apparatus and method of this invention to those in the preferred apparatus and method, shown in FIGS. 1 to 13.

It will be appreciated that a simple, compact and high speed apparatus 10 for erecting a rectangular carton 11 and a method of reliably and effectively erecting such a carton from a flat blank 12, so that the carton is ready for use in the packing and shipping of various types of manufactured goods and produce, have been disclosed. The apparatus 10 is characterized by continuous operation, during which a blank 12 is received from the feeding station A and, in the course of delivering it to the bottom bonding station E as a rectangular tube 11A, the apparatus performs in sequence the necessary folding and adhesive applying functions. As the bottom panels of one rectangular tube 11A are being adhesively bonded to form a carton 11, another blank is being folded to form a succeeding rectangular tube, and no recycling or empty return time is required. As a result, the machine cycle of the apparatus 10 is highly efficient, resulting in a continuous output of up to 40 cartons per minute.

The apparatus 10 of this invention is adapted to handle flat carton blanks 12 of greatly varying sizes, e.g., blanks having a length of 18 to 36 inches (457 mm to 915 mm) and a width of 10 to 29 inches (254 mm to 737 mm), which produce cartons 11 having a length of 10 to 26 inches (254 mm to 660 mm), a width of 6 to 18 inches (152 mm to 457 mm) and a height of 4 to 18 inches (102 mm to 457 mm).

It is considered that the invention and many of its attendant advantages will be understood from the foregoing description and that it will be apparent that various changes may be made in the steps of the method described or in the apparatus utilized to carry out the method without departing from the spirit and scope of the invention or sacrificing all of its material advantages, the method and apparatus hereinbefore described being merely preferred embodiments.

I claim:

1. An apparatus for synchronizing the rotation of two separate elements in opposite directions in a plane about a point between them, comprising:

a double-acting air-operated cylinder having a piston traveling along a line of movement;

a guide bar, adapted to move with the piston of the cylinder;

a pair of first link rods, one end of each first link rod being rotatably connected to the guide bar and the other end of each first link rod extending away from the cylinder;

a pair of second link rods, one end of each second link rod being rotatably connected to the other end of a respective one of the first link rods and the other end of each second link rod extending away from the cylinder; and a pair of blocks, each block being rigidly connected to the other end of the second link rod extending away from the cylinder, one end of each block having a pivotal connection to the other block along a common fixed line of rotation, perpendicular to the line of movement of the piston of the cylinder; the other end of each block being free to rotate about the pivotal connection of the blocks in opposite directions; the free end of each block being connected to one of the two elements; and the other ends of the second link rods converging towards the pivotal connection of the blocks;

the guide bar, the link rods and the blocks moving in a plane, parallel to the plane in which the two elements rotate about the point;

the free ends of the blocks rotating apart, about the pivotal connection of the blocks, from a first position to a second position; the free ends of the blocks being about 90° further apart in their second position than in their first position; and the two elements rotating 90° towards each other with rotation of the free ends of the blocks from their first position to their second position; and the free ends of the blocks being 90° apart in their first position and 180° apart in their second position; and the two elements rotating towards each other to a position 0° apart when the blocks rotate to their second position.

2. The apparatus of claim 1 wherein a separate support shaft is provided on the free end of each block, perpendicular to the block; a separate support arm is provided on each support shaft, that is perpendicular to the support shaft and to the plane in which the two elements rotate and that is connected to one of the two elements; and when the two elements are 90° apart: (a) one element is vertically above the point, its support shaft extends vertically upward from its block, and its block extends horizontally towards the point from the pivotal connection of the blocks; and (b) the other element is horizontally aligned with the point, its support shaft extends horizontally from its block away from the point, and its block extends vertically downward from the pivotal connection of the blocks.

* * * * *